United States Patent
Kim et al.

(10) Patent No.: US 9,338,314 B2
(45) Date of Patent: May 10, 2016

(54) USER TERMINAL APPARATUS AND METHOD OF CONTROL THEREOF

(71) Applicant: Samsung Electronics Co., Ltd, Suwon-si, Gyeonggi-do (KR)

(72) Inventors: Jeong-hun Kim, Hwaseong-si (KR); In-chang Park, Suwon-si (KR); Hyung-jong Kang, Seoul (KR); Mi-sook Song, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/941,888

(22) Filed: Jul. 15, 2013

(65) Prior Publication Data

US 2014/0111820 A1     Apr. 24, 2014

Related U.S. Application Data

(60) Provisional application No. 61/717,181, filed on Oct. 23, 2012.

(30) Foreign Application Priority Data

Nov. 26, 2012  (KR) .......................... 10-2012-0134849

(51) Int. Cl.
*G06F 3/12* (2006.01)
*H04N 1/00* (2006.01)
(Continued)

(52) U.S. Cl.
CPC .......... *H04N 1/00474* (2013.01); *G06F 3/1204* (2013.01); *G06F 3/1205* (2013.01);
(Continued)

(58) Field of Classification Search
CPC ... G06F 3/1204; G06F 3/1205; G06F 3/1254; G06F 3/1225; G06F 15/00; G06F 3/126; G06F 2209/545; G06F 9/54; H04N 1/00474; H04N 1/00222; H04N 1/00236; H04N 1/00411; H04N 1/00482
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS 6,289,371 B1     9/2001  Kumpf et al.
2003/0200289 A1*  10/2003  Kemp et al. ................... 709/221
(Continued)

FOREIGN PATENT DOCUMENTS

EP     2 270 671 A1     1/2011
EP     2 336 873 A2     6/2011
(Continued)

OTHER PUBLICATIONS

How to Print from Windows 8 Metro Style Apps, Brian Burgess, Aug. 14, 2012. pp. 1-9.*
(Continued)

*Primary Examiner* — Thierry L Pham
(74) *Attorney, Agent, or Firm* — Staas & Halsey LLP

(57) ABSTRACT

A user terminal apparatus is provided, which connects to an image forming apparatus, which is driven by an operating system (O/S, and which includes a storage to store the image forming apparatus and a metro application to perform a job. A display displays a background screen of the including a user interface (UI) area corresponding to a job option, a controller implements the metro application, if the UI area is selected, and a communication interface transmits a command to perform the job to the image forming apparatus according to the job option corresponding to the UI area, by using the metro application.

20 Claims, 29 Drawing Sheets

(51) Int. Cl.
*G06F 9/54* (2006.01)
*G06F 15/00* (2006.01)

(52) U.S. Cl.
CPC .............. *G06F 3/1253* (2013.01); *G06F 9/54* (2013.01); *H04N 1/00222* (2013.01); *H04N 1/00236* (2013.01); *H04N 1/00411* (2013.01); *H04N 1/00482* (2013.01); *G06F 2209/545* (2013.01)

(56) References Cited

U.S. PATENT DOCUMENTS

| | | | |
|---|---|---|---|
| 2006/0072144 | A1 | 4/2006 | Dowling et al. |
| 2006/0290949 | A1 | 12/2006 | Nogawa |
| 2007/0002368 | A1 | 1/2007 | Corona |
| 2010/0315686 | A1* | 12/2010 | Hong et al. .................. 358/442 |
| 2010/0328689 | A1 | 12/2010 | Koo et al. |

FOREIGN PATENT DOCUMENTS

| | | |
|---|---|---|
| EP | 2336873 A2 | 6/2011 |
| WO | WO 2006/119533 A1 | 11/2006 |

OTHER PUBLICATIONS

Extended European Search Report mailed Sep. 8, 2014 in related European Application No. 13189948.6.
"Developing a Windows 8 Metro App Part 3: Metro Design—Jennifer Marsman—Site Home—MSDN Blogs", Jun. 20, 2012, XP055136639, Retrieved from the internet: URL:http://blogs.msdn.com/bfjenniferjarchive/2012/06/21/developing-a-windows-8-metro-app-part-3-metro-design.aspx.
Search Report and Written Opinion dated Mar. 31, 2014 issued in International Application No. PCT/KR2013/009465.
Extended European Search Report issued on Sep. 5, 2014 in corresponding European Patent Application No. 13189951.0.
Extended European Search Report issued Sep. 5, 2014 in European Patent Application No. 13189727.4.
Brian Buress, How to Print from Windows 8 Metro Apps, Aug. 14, 2012.
Brian Buress, How to Set Up a Printer in Windows 8, Aug. 2, 2012.
Steven Sinofsky, Simplifying Printing in Windows 8, Jul. 25, 2012.
Steven Sinofsky, Simplifying Printing in Windows 8, Jul. 25, 2015.
Microsoft, "V4 printer Driver", XP002728821, Retrieved from the Internet: Aug. 21, 2014, URL: http:/msdn.microsoft.comjen-usjlibraryjwindowsjhardwardjhh706306(v=vs.85).aspx.
U.S. Appl. No. 13/956,473, filed Aug. 1, 2013, Gi-won Seo, Samsung Electronics Co., Ltd.
U.S. Appl. No. 14/925,361, filed Oct. 28, 2015, In-chang Park, Samsung Electronics Co., Ltd.
U.S. Appl. No. 14/060,713, filed Oct. 23, 2013, In-chang Park, Samsung Electronics Co., Ltd.
Notice of Allowance and Fee(s) Due mailed Nov. 26, 2014 in related U.S. Appl. No. 13/956,473.
Office Action issued Jul. 8, 2014 in related U.S. Appl. No. 13/956,473.
Office Action issued Dec. 17, 2015 in related U.S. Appl. No. 14/925,361.
Notice of Allowance issued Jul. 16, 2015 in related U.S. Appl. No. 14/060,713.
Office Action issued Apr. 24, 2015 in related U.S. Appl. No. 14/060,713.
Office Action issued Nov. 3, 2014 in related U.S. Appl. No. 14/060,713.

* cited by examiner

USER TERMINAL APPARATUS AND METHOD OF CONTROL THEREOF

CROSS-REFERENCE TO RELATED APPLICATIONS

This application claims priority under 35 U.S.C. 119(a) from U.S. Provisional Patent Application No. 61/717,181, filed on Oct. 23, 2012, in the United States Patent and Trademark Office, and Korean Patent Application No. 10-2012-0134849, filed on Nov. 26, 2012, in the Korean Intellectual Property Office, the disclosure of which is incorporated herein by reference in its entirety.

BACKGROUND

1. Field

Apparatuses and methods disclosed herein generally relate to a user terminal apparatus and a method of control thereof, and more specifically, to a user terminal apparatus which connects to an image forming apparatus and a method of controlling the user terminal apparatus.

2. Description of the Related Art

An image forming apparatus operates to print out the print data generated at a user terminal apparatus such as a computer onto a printing material. An example of the image forming apparatus includes a copier, a printer, a facsimile, or a multi function peripheral (MFP) implementing as one apparatus a combination of functions of the copy machine, the printer and the facsimile.

The image forming apparatus performs jobs of printing, scanning and faxing according to controlling of a user terminal apparatus.

A user terminal apparatus is driven by an operating system (O/S). An O/S is a main part of system software and classes of programs providing an interface so that a user may utilize a user terminal apparatus more easily. Although the operation system Windows® 8 is recited herein, other operating systems may also be implemented.

One O/S of a user terminal apparatus, Windows® 8 of Microsoft is a hybrid O/S that supports different types of a plurality of user interfaces (UI). Windows® 8 supports a desktop style user interface (UI) (or desktop UI) which is implemented from an initial Windows® operating system to a Windows® 7 operating system and a new graphic user interface which is a metro style UI (or metro UI, Windows® 8 Style UI, a tile-type UI). The metro style UI implements a metro application that utilizes a design language that has a sleek, modern typography, consolidates groups of common tasks to speed up usage, excludes superfluous graphics, and relies on an actual content to function as a main user interface.

Windows® 8may access applications and contents more conveniently in a tablet and a smart phone, as well as a personal computer by supporting the metro style UI, i.e., the new graphic user interface and providing an interface optimized for touch.

However, the metro style UI environment of Windows® 8 may have several limitations in controlling an image forming apparatus that are unlikely to be encountered in a conventional desktop UI environment.

Specifically, because bulk channel communication of a universal serial bus (USB) at Windows® 8 is limited, both a desktop style UI environment and a metro style UI environment may not be scanned with a USB. Further, even if using a network, because a metro style environment does not support a standard software interface to use image scanners such as Window Image Acquisition (VVIA) and Technology Without Any Interested Name (TWAIN), the metro style UI environment of Windows® 8 does not provide a scan function.

Since the metro style UI environment of Windows® 8 does not have attributes to capture an Internet Protocol (IP) address that is necessary to enable communication of an image forming apparatus connected with a network or Application Program Interface (API), a scan function is not provided.

Information regarding port names and model names to be used in connecting an image forming apparatus to a user terminal apparatus may be obtained with a printer spooler. However, port names may be modified by the user voluntarily, which is already difficult to use. Thus, a method of obtaining an IP address of the image forming apparatus is required.

Further, informing a user of status errors of an image forming apparatus is limited when using the metro style UI environment of Windows® 8. A background program cannot be implemented on Windows® 8, and a user may not be informed if there is an event that logs information concerning status errors. In this case, Windows® 8 creates an event, i.e., logged data, and displays a status error information to inform the user of the status error through a printer driver. However, Windows® 8 compares each status only with EqualTo, NotEqualTo, GreaterThan, and LessThan, and thus, has limitations that do not provide status information on various conditions, or that do not provide status information through a conventionally used interface.

Further, in the metro style UI environment of Windows® 8, a user may enter a background screen of the O/S at any time. Thus, if a user implements jobs of an image forming apparatus and exits a corresponding application, the user cannot check a job processing status of an image forming apparatus on the background screen of the O/S. In addition, if a plurality of image forming apparatuses connect and if many job options should be established, a user is inconvenienced because he needs to implement a corresponding application, select an image forming apparatus to implement a job, and establish respective job options.

SUMMARY OF THE INVENTION

Exemplary embodiments of the present general inventive concept overcome the above disadvantages and other disadvantages not described above. Additional features and utilities of the present general inventive concept will be set forth in part in the description which follows and, in part, will be obvious from the description, or may be learned by practice of the present general inventive concept.

The present general inventive concept is suggested for the above problems, to provide a user terminal apparatus and a control method thereof which provides a convenient implementation of a job without requiring complicated processes. A user interface (UI) area is provided on which an image forming apparatus to perform a job and a job option are automatically applied, and which displays a job performing status on the UI area so that users are able to intuitively observe the job performing information on a real time basis.

In one exemplary embodiment, a method of controlling a user terminal apparatus which may connect to an image forming apparatus may include displaying a background screen comprising a user interface (UI) area that corresponds to a job option, so that if the UI area is selected, implementing a metro application to perform a job with the image forming apparatus, and transmitting a command to perform the job to the image forming apparatus based on the job option corresponding to the UI area.

The transmitting the command to perform the job may include displaying a job performing page of the application on which the job option corresponding to the UI area is automatically implemented, and if a user manipulation to modify the job option is inputted on the job performing page, transmitting a command to perform the job to the image forming apparatus based on the modified job option is implemented.

The method may additionally include displaying job performing information of the image forming apparatus on the UI area, while the job is performed at the image forming apparatus according to the command to perform the job.

If the job is completed at the image forming apparatus according to the command to perform the job, the method may include displaying a result of performing the job at the image forming apparatus on the UI area.

In one exemplary embodiment, a method of controlling a user terminal apparatus which connects to an image forming apparatus may include receiving a selection of a job option to be applied to the image forming apparatus, generating a user interface (UI) area corresponding to the selected job option, displaying the generated UI area on a background screen of the Windows® 8, and mapping and storing the job option to the UI area.

Prior to the receiving of the selection of the job option, the method may include driving the metro application to perform the job, if a predefined UI area is selected on the background screen.

The generating of the UI area corresponding to the selected job option and the displaying the generated UI area on the background screen of the Windows® 8 may include, if there is a previously generated UI area corresponding to the image forming apparatus, updating the job option corresponding to the previously generated UI area according to a user manipulation, and displaying and storing the result.

The receiving of the selection of the job option may include receiving a selection of an image forming apparatus to perform the job in addition to the job option.

The UI area may be configured in a tile form which displays at least one of the job option and device information of an image forming apparatus to perform the job.

In one exemplary embodiment, a user terminal apparatus which may connect to an image forming apparatus may include a display which displays a background screen including a user interface (UI) area corresponding to a job option, a controller which implements the metro application, if the UI area is selected, and a communication interface which transmits a command to perform the job to the image forming apparatus based on the job option corresponding to the UI area, by using the metro application.

The display may display a job performing page of the application on which the job option corresponding to the UI area is automatically applied, and if a user manipulation to modify the job option is inputted, the communication interface may transmit a command to perform the job to the image forming apparatus based on the modified job option.

The controller may display job performing information at the image forming apparatus on the UI area, while the job is performed at the image forming apparatus according to the command to perform the job.

The controller may display a result of performing the job at the image forming apparatus on the UI area, if the job is completed at the image forming apparatus according to the command to perform the job.

In one exemplary embodiment, a user terminal apparatus which may connect to an image forming apparatus may include a user interface which receives a selection of a job option to be applied to the image forming apparatus, a controller which controls so that the generated UI area is displayed on the background screen, and a storage which maps the job option to the UI area and stores the result.

If a predefined UI area is selected on the background screen, the controller may perform an application to perform the job.

If there is a previously generated UI area corresponding to the image forming apparatus, the controller may update the job option corresponding to the previously generated UI area according to a user manipulation to the selected job option.

The user interface may receive and display a listing of job options and an identification of an image forming apparatus to perform the job.

The UI area may be configured in a tile shape displaying at least one of the job option and device information of an image forming apparatus to perform the job.

In one exemplary embodiment, a computer readable recording medium including a program to implement a method of controlling a user terminal apparatus which may connect to an image forming apparatus, may include displaying a background screen including a user interface (UI) area corresponding to a job option on a background screen, and if the UI area is selected, performing an application to perform the job with the image forming apparatus, and transmitting a command to perform the job to the image forming apparatus based on the job option corresponding to the UI area.

In one exemplary embodiment, a computer readable recording medium including a program to implement a method to control a user terminal apparatus which may connect to an image forming apparatus may include receiving a selection of a job option to be applied to the image forming apparatus, generating a UI area corresponding to the selected job option, displaying the generated UI area on a background screen, and mapping the job option to the UI area and storing the result.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1A:
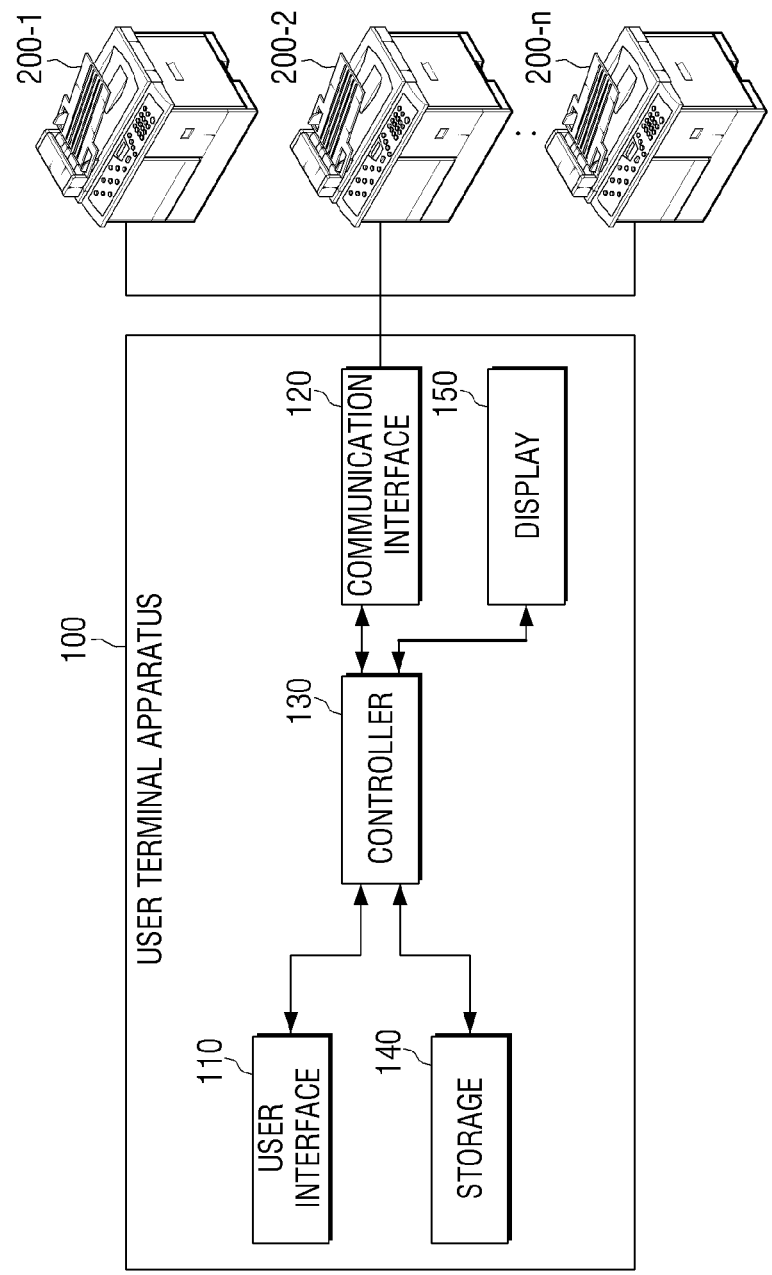
FIG. 1A is a block diagram illustrating a user terminal apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present general inventive concept may be carried out without those specifically defined matters. Also, well-known functions or constructions are not described in detail since they would obscure the invention with unnecessary detail.

Referring to the attached drawings, the invention will be described in detail below.

FIG. 1A illustrates a user terminal apparatus according to an exemplary embodiment of the present general inventive concept.

Referring to FIG. 1A, a user terminal apparatus 100 may include a user interface 110, a communication interface 120, a controller 130, a storage 140, and a display 150. The user terminal apparatus 100 may connect at least one of image forming apparatuses 200-1, 200-2, 200-*n* through the communication interface 120.

Although at least one of image forming apparatuses 200-1, 200-2, 200-*n* may connect to the user terminal apparatus 100, the following will be described by assuming that one image forming apparatus 200 is connected for convenience.

The user interface 110 can include a plurality of function keys that a user can establish or select various functions supported by the user terminal apparatus 100, and displays various information provided from the user terminal apparatus 100. That is, for example, a function such as printing, scanning or faxing may be supported by the user terminal apparatus 100.

The user interface 110 may be implemented by combining a monitor and a mouse, or may be an apparatus simultaneously operating input and output such as a touch screen. In this case, the user interface 110 may be configured by layering a touch detector 102 and a user interface display 104. A touch detector may be implemented as touch sensor perceiving user touch and near-distance sensor perceiving approaching of user touch within near distance, and a display may be implemented as a liquid crystal display (LCD) panel, a light emitting diode (LED) display, or an organic light emitting diode (OLED) display which may display various screens such as a background screen including various sorts of icons, a web browsing screen, an application implementing screen, screen playing sorts of contents such as a video and a photograph, and a user interface screen.

The communication interface 120 communicates with at least one image forming apparatus 200 in a wired and/or wireless communications link. Specifically, communication may be performed by contacting with a Universal Serial Bus (USB) port as well as a Local Area Network (LAN) and an internet network. The communication interface 120 may transmit controlling signals to at least one image forming apparatus 200 and receive data therefrom.

The controller 130 controls units of the user terminal apparatus 100. Specifically, the controller 130 recalls signals or data inputted from a Read-Only Memory (ROM) storing controlling program in order to control a central processing unit (CPU) and the user terminal apparatus 100, and from external apparatuses of the user terminal apparatus 100, and includes a Random Access Memory (RAM) used as a recall area of operations performed in the user terminal apparatus 100. The CPU may include at least one of a single core processor, a dual core processor, a triple core processor, and a quad core processor. Some examples of controller 130 are a processor, a field programmable gate array, an integrated circuit and programmable logic devices. The CPU, the ROM and the RAM connect to each other through an internal bus.

The storage 140 stores metro application to perform jobs with the image forming apparatus 200 and a V4 driver to communicate with the image forming apparatus 200.

The storage 140 may be a storing medium within the user terminal apparatus 100 and an external storing medium, e.g., removable disk including a USB memory or a web server through the network. The RAM and the ROM used in storing and operating controlling programs may be units of the controller 130; however, the RAM and the ROM may alternatively be implemented as one unit of the storage 140.

The term, "storage," may include a storage 140, a ROM, a RAM, or a memory card (e.g., an SD card or a memory stick) that is attachable/detachable to the user terminal apparatus 100. Further, storage may include a non-volatile memory, a volatile memory, a hard disk drive (HDD), or a solid state drive (SSD).

The display 150 may display various screens such as a background screen having various sorts of tiles, a web browsing screen, an application implementing screen, a screen playing various sorts of contents such as a video or a photograph, and a user interface screen according to controlling of the controller 130.

Although the exemplary embodiment describes that the display 150 and the user interface 110 may be separate units, the display 150 and the user interface 110 may be configured as one unit. In this case, the display 150 may be implemented as a touch screen perceiving a user touch. Specifically, the display 150 may be configured by layering a touch detector and a display. A touch detector may be implemented as touch sensor that perceives user touch and a near distance sensor that perceives an approaching of a user touch. The display 150 may be implemented as a liquid crystal display (LCD) panel, an LED display panel, and/or an OLED display panel.

Figure 1B:
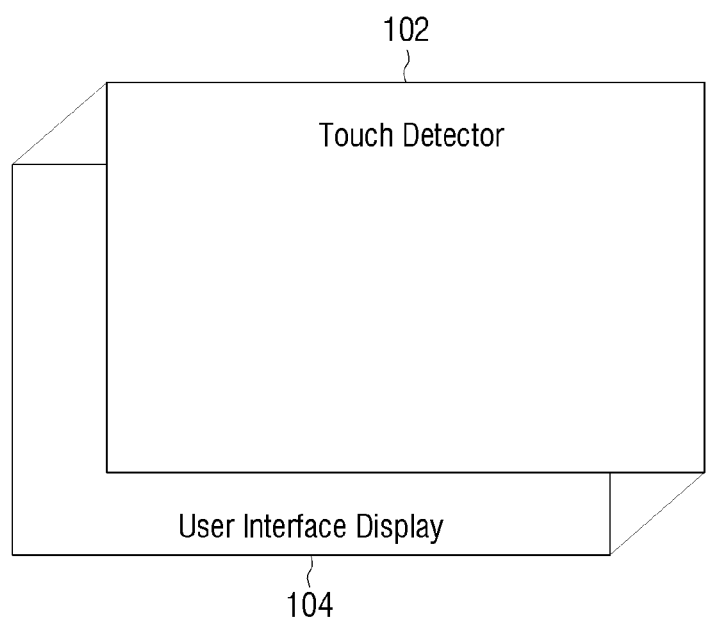
FIG. 1B is a block diagram illustrating an exemplary user interface having a touch detector and a user interface display.

The user terminal apparatus 100 having the above units will be described according to each exemplary embodiment below. FIG. 1B is a block diagram of an exemplary embodiment of a user interface 110 having a touch detector 102 and a user interface display 104. That is, upon the touch detector 102 detecting a touch by a user in a selected area of the user interface display 104, the touch detector 102 activates an application associated with the selected, touched area. In the metro style UI environment, the selected, touched area may be a main tile which may, for example, be a rectangle or square shape of an icon used as a background screen, which is described more fully below.

Figure 1C:
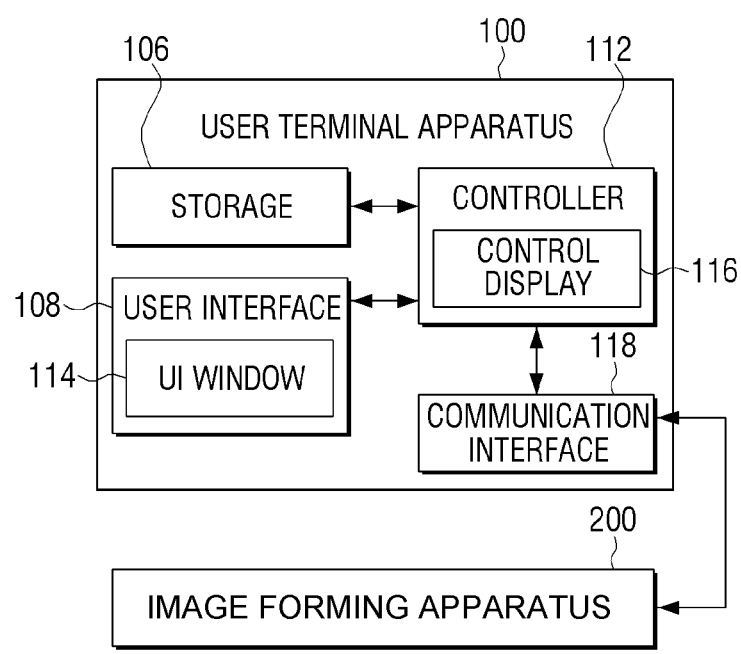
FIG. 1C is a block diagram illustrating an exemplary user terminal apparatus having a storage, a user interface and a controller.

FIG. 1C is a block diagram illustrating an exemplary embodiment of a user terminal apparatus 100 having a storage 106, a user interface 108 and a controller 112, where the user terminal apparatus 100 is coupled to an image forming apparatus 200. A user terminal apparatus 100 connects to an image forming apparatus 200. The user terminal apparatus 100 is driven by an operating system (O/S) such as, for example, Windows® 8. The user terminal apparatus includes a storage 106 which stores address and/or status information of the image forming apparatus 100, a job option, and a metro application to perform a job. The user interface 108 receives a selection of a job option to be applied to the image forming apparatus 200 via a user interface window provided by the metro application, and displays a generated user interface (UI) area on a background screen of the Windows® 8 on the user interface 108. A controller 112 maps the job option to the UI area and stores the result at the storage 106.

In the following, the user terminal apparatus 100 according to the exemplary embodiment will be explained. Windows® 8 supports a metro style UI environment, and a scan function of an image forming apparatus 200 may not be supported in the metro style UI environment. Further, address information of the image forming apparatus 200 may not be provided directly to an application. Thus, the user terminal apparatus 100 according to the exemplary embodiment may use a predefined printer driver, obtain address information of the image forming apparatus 200, and perform the scan function by using the obtained address information.

The user interface 110 according to the exemplary embodiment may receive a command to perform the scan job of the image forming apparatus 200 by using a user interface window provided from a metro application when the metro application operates.

The user interface 110 according to the exemplary embodiment may receive a command to perform a scan job of the image forming apparatus 200.

The user interface 110 may display an image forming apparatus 200 supporting a predefined printer driver determined by controlling of the controller 130, and may select an image forming apparatus 200 to perform a command to perform the scan job. The predefined printer driver may be a V4 version of a printer driver.

The predefined printer driver indicates the program to control the printer by using a predefined Bidi communication schema (i.e., bidirectional printer communication). Because the printer driver has a different control method according to an apparatus type, a separate printer driver should be installed.

For example, Windows® 8 supports the V4 version of the printer driver (hereafter, referred to as the V4 driver), and the printer driver may get an IP address and a status information of the printer through the Bidi communication. The Bidi communication schema in eXtensible Markup Language (XML) format may be defined and used to obtain the IP address and the status information of the printer.

The predefined Bidi communication schema will be explained in detail by referring to FIG. 3.

With the V4 driver, the communication interface 120 requests address information of an image forming apparatus 200, and receives address information of the requested image forming apparatus 200. Specifically, the communication interface 120 may request and receive network address information to the image forming apparatus 200 supporting the V4 driver.

Further, the communication interface 120 may use the V4 driver, request address information of the image forming apparatus 200 selected by the controller 130 to the image forming apparatus 200, and receive address information from the image forming apparatus 200.

With the V4 driver, the communication interface 120 may request and receive status information of the image forming apparatus 200, as well as address information of the image forming apparatus 200.

Status information may include at least one of network information, supportable job information, and component consumption information regarding an image forming apparatus 200. Component consumption information may include an amount of toner available, an amount of printing medium, and the like. Specifically, the network information indicates information regarding a network connecting status of an image forming apparatus 200, a network security status, and a network address (port address or IP address). Supportable job information indicates information regarding whether jobs such as print, scan or fax are supported, and whether options in each job are supported.

Status information includes capability information, provides a troubleshooting guide based on the capability information, and provides functions of ordering consumables or linking a web page of manufacturers. Further, status information may display notification of errors while printing, may provide a troubleshooting guide to a user during selecting, or may be used in establishing high quality print options such as eco settings (providing various power settings and/or setting to maintain print quality while reducing the amount of materials (e.g., ink, toner, etc.) used in printing), job accounting, and confidential expression setting.

Address information can include a network address of an image forming apparatus 200, i.e., an IP address. Because the network address of an image forming apparatus 200 may not be obtained in an O/S of this exemplary embodiment, the network address may be transmitted from the image forming apparatus 200 by using a predefined printer driver.

Although the address information of an image forming apparatus 200 may have a separate meaning from the status information, the address information of the image forming apparatus 200 may be included in the status information of the image forming apparatus 200.

The Bidi communication schema used during requesting and receiving the address information and the status information of an image forming apparatus 200 will be further explained by referring to FIG. 3 below.

The communication interface 120 may receive scan data corresponding to a command to perform a scan job from the image forming apparatus 200.

The controller 130 controls the communication interface 120 to transmit the command to perform the scan job to an image forming apparatus 200 based on the address information of the image forming apparatus 200 and to transmit scan data corresponding to the command to perform the scan job. Specifically, the controller 130 may control the communication interface 120 to transmit the command to perform the scan job by using a communication protocol different from a protocol of the predefined printer driver.

The controller 130 may not use the predefined printer driver after obtaining the address information of an image forming apparatus 200, but instead may directly connect to the image forming apparatus 200 based on the address information of the image forming apparatus 200, and control the communication interface 120 to transmit/receive the command to perform the scan job and to transmit scan data. Specifically, the controller 130 controls transmitting the command to perform the scan job with another network module different from the predefined printer driver.

The another network module different from the predefined printer driver is a module directly communicating an image forming apparatus 200 by using a protocol such as Simple Network Management Protocol (SNMP) or Hyper Transfer Protocol (HTTP), and can be directly controlled at a metro style application.

If the command to perform the scan job is inputted to the user interface 110, the controller 130 may determine whether an image forming apparatus 200 supports the predefined printer driver, and display the image forming apparatus 200 supporting the predefined printer driver.

The controller 130 may transmit scan options selected in the user interface 110 with a command to perform the scan job sent to the image forming apparatus.

Scan options are setting values to perform the scan job, e.g., values setting whether both sides are scanned, whether a color scan is performed, a resolution, a brightness, and an image size. Scan options may be set according to, for example, a status address of an image forming apparatus 200, i.e., supportable job information.

The storage 140 stores the metro application displaying a user interface window to receive a command to perform the scan job and the V4 driver communicating with an image forming apparatus.

The storage 140 may store a list that includes the image forming apparatuses 200 connected to the user terminal apparatus 100. The list that includes the image forming apparatuses 200 may include port names or model names of the image forming apparatuses 200.

FIG. 1A illustrates the storage 140, the user interface 110, the display 150, and the image forming apparatuses 200. The storage 140 may map address information and status information of the image forming apparatuses 200 transmitted from the image forming apparatuses 200 with the list that includes the image forming apparatuses 200, and may store mapped information. After mapping and storing, the storage 140 may store scan data transmitted from the image forming apparatuses 200.

The display 150 may display the user interface window so as to receive a selection of scan options based on the status information of the image forming apparatus 200 received from the communication interface 120. Further, the display 150 may display the list that includes the image forming apparatuses 200 that support the predefined printer driver according to determining of the controller 130.

The communication interface 120 may display scan data corresponding to the command to perform the scan job received from the communication interface 120.

The user terminal apparatus 100 according to an exemplary embodiment as described above may obtain address information of the image forming apparatuses 200 connected to the user terminal apparatus 100 in the O/S that does not directly provide address information of the image forming apparatuses 200, and may provide an application performing scan job by using the address information.

In the following, a user terminal apparatus 100 according to another exemplary embodiment will be described. A metro style UI environment of Windows® 8 has limitations in status information with respect to errors of an image forming apparatus 200. Specifically, a user may be informed of an error status only during performing of a print job of an image forming apparatus 200, and the types of error status have 128 limitations provided in an O/S. Thus, about 500 error statuses provided from conventional image forming apparatuses can not be fully delivered.

Thus, the user terminal apparatus 100 according to the present exemplary embodiment is installed to provide status information with respect to errors which cannot be provided to a user conventionally due to the above limitations without changing firmware of an image forming apparatus 200.

The user interface 110 may receive user manipulation to select a user interface window that displays a status message provided from a metro application. Further, user manipulation to set types of a first status message requesting a second status message may be inputted.

A first status message and a second status message will be explained in detail during describing the communication interface 120 below.

The communication interface 120 may utilize a printer driver of an image forming apparatus 200, and receive a first status message and address information of an image forming apparatus 200. The printer driver may be a V4 driver.

Further, the communication interface 120 may utilize address information of an image forming apparatus 200 according to controlling of the controller 130, request a second status message to the connected image forming apparatus 200, and receive a second status message. Specifically, after getting address information of the image forming apparatus 200 by controlling of the controller 130, the communication interface 120 may connect the image forming apparatus 200 based on the address information of the image forming apparatus 200 without utilizing the printer driver. In this case, the communication interface 120 may communicate with the image forming apparatus 200 by using another network module that is different from the printer driver. For example, the metro app 10 may directly communicate with the image forming apparatus 200 by utilizing a communication protocol such as Simple Network Management Protocol (SNMP), Hypertext Transfer Protocol (HTTP), and/or Universal Serial Bus (USB) protocol.

In this exemplary embodiment, a first status message of the image forming apparatus 200 is a predefined message in the printer driver. Specifically, a first status message may be a message defined in event XML of the printer driver. For example, the metro UI environment of Windows® 8 supports the V4 version of the printer driver, and the printer driver may load the predefined event XML. Thus, because the status message defined in the loaded event XML is only received, a further detailed status of the image forming apparatus 200 may not be checked.

The first status message according to an exemplary embodiment may be 13 status messages redefined in the V4 printer driver: DoorOpen, MarkerSupplyLow, MarkerFailure, MarkerSupplyEmpty, MediaLow, MediaEmpty, MediaJam, MediaNeeded, OutputAreaAlmostFull, OutputAreaFull, AttentionRequired, Paused, End of job or job cancel among messages classified as errors of 128 status messages supported by O/S in metro UI environment of Windows® 8.

Additional explanations of the first status message are discussed below in connection with FIG. 8, which illustrates metro app 10 obtaining status information from a print spooler 20 such as, for example, information on performing an operation of connecting to a troubleshooting page.

A second status message indicates a message delivering a more detailed status of the image forming apparatus 200 than the first status message and having comparing attributes that are not defined in the printer driver. Because the second status message may provide more types of status information compared to the first status message, a further detailed status of the image forming apparatus 200 may be provided to the user terminal apparatus 100.

Additional explanation of the second status message are discussed below in connection with FIG. 9, which illustrates metro app 10 obtaining further status information (such as SM.XML and a status code of Lite SM 17) in addition to the status information obtained with the first status message will follow by referring to FIG. 9.

Address information of the image forming apparatus 200 indicates the network address of the image forming apparatus 200, i.e., the IP address, as described in the exemplary embodiment. Because the network address of the image forming apparatus 200 cannot be obtained in the O/S of this exemplary embodiment, the network address may be transmitted from the image forming apparatus 200 by using the printer driver.

The controller 130 may utilize address information of the image forming apparatus 200, and request the second status message more detailed than the first status message to the image forming apparatus 200. Specifically, the controller 130 may not use the printer driver after obtaining the address information of the image forming apparatus 200, and may directly control the communication interface 120 to connect the image forming apparatus 200 based on the address information of the image forming apparatus 200.

According to the types of the received first status message, the controller 130 may determine whether requesting the second status message is required. Specifically, according to the types of the first status message predefined in the printer driver, the controller 130 may determine whether requesting the second status message having further detailed information is required.

For example, if the "DoorOpen" status message is received, comparing conditions included in the first status message are enough to provide information to a user. However, if the "PaperEmpty" status message is received, comparing conditions included in the first status message are insufficient to provide information on which paper feeder among at least one paper feeders is short of paper materials. Thus, the second status message which is more detailed than the first status message may be determined to be required. As a result, if the "DoorOpen" status message is received, the second status message may be determined to be unnecessary. However, if the "PaperEmpty" status message is received, the second status message may be determined to be required.

Like the above example, the second status message may be requested from an image forming apparatus 200 only if the controller 130 determines to require a second status message. The determining process will be explained below by referring to FIG. 10.

If inputting user manipulation to set types of the first status message where the second status message will be further requested, the controller 130 may determine whether to request the second status message according to the types of the first status message. Specifically, the user terminal apparatus 100 may receive established types of the first status message where the second status message will be requested directly from a user. Thus, according to the types of the first status message set by the user, the controller 130 may determine whether to request the second status message. Further explanation will follow in connection with FIG. 12.

If status attributes extracted from the second status message are not warning or error, the controller 130 may request the second status message again after a delay of a predetermined time.

For example, unlike in the first status message, the second status message may include various information regarding a status of the image forming apparatus 200. Specifically, the second status message may include at least one attribute of warning, error and information regarding a status of the image forming apparatus 200. In this case, if status attributes extracted from the second status message are not warning or error, the controller 130 may receive the second status message again after a delay of a predetermined time. The reason to implement such an operation is that receiving time points of the first status message and the second status message are different from each other. Thus, by considering an updating time of a status in the image forming apparatus 200, the second status message may be received after a delay of a predetermined time if it is not an error and/or warning. If the second status message refers to an error and/or a warning, information may be displayed in a pop-up format based on the second status message, and the information process may be complete if the second status message refers to information.

If inputting user manipulation to select a pop up displayed on the display 150, the controller 130 may use at least one of the first status message and the second status message and connect to a troubleshooting page. Specifically, if the controller 130 does not receive the second status message, the troubleshooting page may be connected by the controller 130 by using the first status message. If the controller 130 receives the second status message, the troubleshooting page may be connected by the controller 130 by using both of the first and the second status messages. Specific explanation of connecting the troubleshooting page will follow in connection with FIGS. 9 and 10.

The storage 140 may store a predefined first status message. Further, the storage 140 may store types of the first status message where the second status message will be requested.

The display 150 displays at least one of the first and the second status messages. Specifically, if not receiving the second status message, the image forming apparatus 200 provides a status to a user by extracting the status from the first status message, and a pop up of an interface window delivers information. If receiving the second status message, the image forming apparatus 200 provides the status to the user by extracting the status based on the first and the second status messages and information may be displayed on user interface window of the metro application in pop-up format.

A method of displaying information by the display 150 may use a pop-up format or other various types of information display.

The user terminal apparatus 100 according to the exemplary embodiment as described above may receive a detailed status message of the image forming apparatus 200 in the O/S having limitations in an information status of the image forming apparatus 200, and may provide an information status regarding errors or warnings of the image forming apparatus 200 to the user.

In the following, a user terminal apparatus 100 according to another exemplary embodiment will be explained. In a metro style UI environment of Windows® 8, unlike a conventional desktop UI environment, a plurality of secondary tiles in a direct format may be created for one application.

A tile is a rectangle or square shape of icon used for a background screen in metro style UI environment of Windows® 8, and has a link function to move to applications, websites, address books, and other items. Unlike conventional icons, a tile may display changes of information regarding each connected item on a real time basis, and for example, display a number of unread messages in a received letter box on a real time basis. A tile may be classified into two types, an application tile (main tile) and a secondary tile. The application tile (main tile) indicates that the tile is created when installing applications, and the secondary tile indicates that the tile is additionally created by the user. Tile will be further explained by referring to FIG. 15.

A user may use a previously created secondary tile and enter a specific page of a corresponding application at any time, and a processing status of the corresponding application may be displayed on the secondary tile at any time.

The user terminal apparatus 100 according to the exemplary embodiment to be described below may use a secondary tile, and may perform jobs of an image forming apparatus 200. Therefore, a solution is provided to the problem that a job processing status of an image forming apparatus cannot be checked on a background screen of the O/S if the corresponding application screen is exited, and to a solution to the inconvenience that an image forming apparatus to perform jobs may be selected and each of the job options may be set if a plurality of image forming apparatuses are connected and if too many job option settings are provided.

The user interface 110 receives a selection of job options applied to an image forming apparatus 200 through a user interface window provided by metro applications.

In this case, the user interface 110 may receive the selection of an image forming apparatus 200 to perform jobs as well as a selection of job options.

Further explanation is provided below in connection with FIG. 20.

The communication interface 120 uses a metro application and transmits a command to perform a job to the image forming apparatus 200 based on job options corresponding to a UI area. Specifically, if a UI area corresponding to job options is selected, the controller 130 implements the metro application to perform jobs with the image forming apparatus 200, and automatically applies the job options corresponding to the UI area. The communication interface 120 may transmit the command to perform the job to the image forming apparatus 200 based on the applied job options.

The UI area is an area displaying at least one of job options and device information of the image forming apparatus 200 to perform jobs. The UI area may be configured in a tile shape format. The tile may be a secondary tile in a metro style UI environment of Windows® 8. The exemplary embodiment provides that the UI area is created in a tile shape format; however, the UI area shape may change.

If inputting user manipulation to modify job options on a job performing page, the communication interface 120 may transmit a command to perform a job to the image forming apparatus 200 based on the modified job options. Specifically, if the UI area corresponding to job options is selected, the display 150 may display the job performing page of the application on which job options corresponding to the UI area are automatically applied. If the job options are modified on the displayed job performing page, the communication interface 120 may transmit the command to perform the job to the image forming apparatus 200 based on the modified job options.

The controller 130 controls creating the UI area corresponding to a selection of job options, and displaying the created UI area on a background screen. The created UI area corresponding to the job options may be a secondary tile as described above. Further explanation is provided in connection with FIG. 20.

When finding the previously created UI area regarding the image forming apparatus 200, the controller 130 may control updating the job options corresponding to the previously created UI area to the job options selected in the user interface 110, displaying the updated job options on the background screen, and storing the updated job options in the storage 140. Specifically, if a secondary tile corresponding to the image forming apparatus 200 selected by the user is already created on the applications, a new secondary tile may be created or a previous secondary tile may be newly updated according to a user selection. Further explanation will be provided below in connection with FIG. 22.

If the predefined UI area is selected on the background screen, the controller 130 may implement the application to perform the jobs. The predefined UI area is a main tile so as to implement an application that performs jobs of the image forming apparatus 200, which may be provided when installing applications. This will be further described below in connection with FIG. 20.

If a UI area corresponding to the job options is selected, the controller 130 may implement the metro application to perform the jobs with an image forming apparatus. The UI area corresponding to the job options may be a secondary tile described above.

The controller 130 may control mapping job options with the UI area and storing the mapped information.

While jobs are performed in an image forming apparatus 200 according to a command to perform the job, the controller 130 may display job performing information of the image forming apparatus 200 on the UI area. Specifically, the controller 130 may display a job processing status of the image forming apparatus 200 on a secondary tile corresponding to the image forming apparatus 200. This will be further explained in detail below in connection with FIG. 24

If jobs are completed in an image forming apparatus 200 according to the command to perform the job, the controller 130 may display the job performing results of the image forming apparatus 200 on the UI area. Specifically, the controller 130 may display the job performing results of an image forming apparatus 200 on the secondary tile corresponding to the image forming apparatus 200. This will be further explained in detail below in connection with FIG. 24.

The storage 140 may map selected job options with a corresponding UI area and store mapped results. Specifically, the storage 140 may map job options that are selected by the user with a created UI area, i.e., with a secondary tile and store mapped information. The storage 140 may list the job options and may also map information of the image forming apparatus to perform the jobs with a created UI area, i.e., with the secondary tile, and store the mapped data. For example, the storage 140 may map and store device information and job option setting information of the image forming apparatus 200 with a tile ID using created time information as a key. This is further described below in connection with FIG. 15.

The display 150 displays a background screen having a UI area corresponding to the job options. Specifically, the display 150 may display the background screen of an O/S having the UI area corresponding to the job options, i.e., the secondary tile.

If the UI area corresponding to the job options is selected, the display 150 may display a job performing page of an application in which the job options corresponding to the UI area are automatically applied.

The user terminal apparatus 100 according to the exemplary embodiment described above may provide a UI area where the image forming apparatus 200 to perform the jobs and job options are automatically applied, and thus, may perform jobs without redundant processing. Further, a job processing status may be displayed on the UI area, and the user intuitionally observes the job processing information on a real time basis.

In the following, programs implemented in the user terminal apparatus 100 will be explained by referring to FIG. 2. Explanations may be commonly applied to each of the exemplary embodiments.

Figure 2:
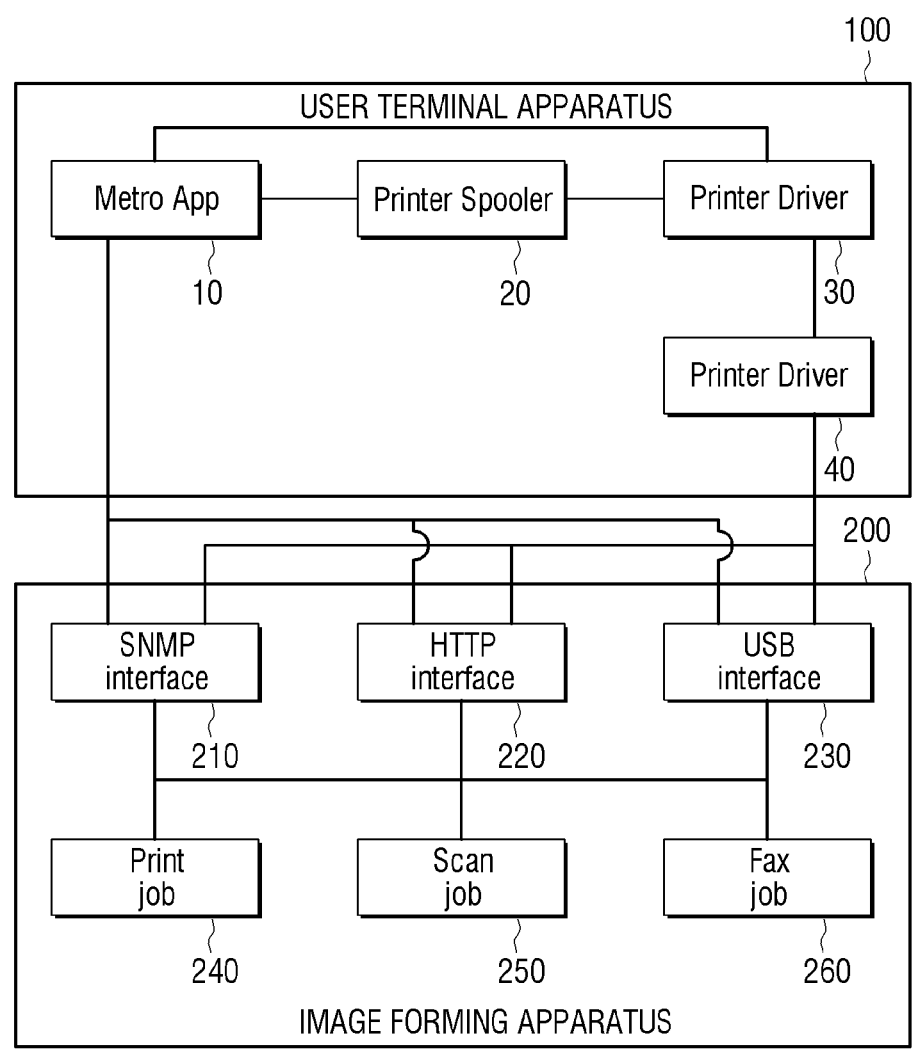
FIG. 2 is a block diagram illustrating a plurality of programs implemented in a user terminal apparatus according to an exemplary embodiment of the present general inventive concept.

FIG. 2 is a block diagram of programs being implemented in the user terminal apparatus 100 according to an exemplary embodiment.

By referring to FIG. 2, in order to control the image forming apparatus 200, programs such as the metro application 10 (i.e., metro app 10), the printer spooler 20, the printer driver 30, and the port monitor 40 may be implemented in the user terminal apparatus 100.

Metro app 10 is an application that includes a metro style UI environment of Windows® 8, where the metro app 10 performs various job functions of the image forming apparatus 200. Metro app 10 may support a start experience, an advanced print setting experience, and a print notification experience defined by Microsoft®.

Further, metro app 10 may directly communicate with the image forming apparatus 200 by utilizing another network module without using the printer driver 30. Communication protocols used in this case are SNMP, HTTP, and USB.

Metro app 10 may be named as a Microsoft® store application or a metro application. If installing the printer driver 30 of the image forming apparatus 200, metro app 10 may be automatically installed in the user terminal apparatus 100. Further, metro app 10 provides additional information by interlocking with the image forming apparatus 200, and provides an additional troubleshooting guide, an order for consumables, and a manufacturer website link regarding errors during printing to enhance a user's convenience.

Printer spooler 20 manages an image forming apparatus 200 installed in the user terminal apparatus 100 and controls transmitting image forming jobs of the image forming apparatus 200.

The printer driver 30 is a program to control the image forming apparatus 200 in the user terminal apparatus 100, and performs a function of converting commands delivered from applied programs to the image forming apparatus 200 into commands suitable for the image forming apparatus 200 during printing.

The exemplary embodiment supports a V4 version of the printer driver in a metro UI environment of Windows® 8, and the printer driver 30 may obtain an IP address and status information of a printer through Bidi communication. Bidi communication schema in XML format may be defined and used to obtain the IP address and status information of the printer.

Printer driver 30 may be named as the V4 driver in a metro UI environment of Windows® 8.

Port monitor 40 is the network interface supported by a metro UI environment of Windows® 8, and supports protocols such as Transmission Control Protocol/Internet Protocol (TCP/IP), USB, and Web Services on Devices (WSD). However, Port monitor 40 has several limitations. For example, a control channel may not be supported regarding USB, and types of status messages regarding the image forming apparatus 200 are limited.

Although FIG. 2 illustrates that port monitor 40 is a separate program from a printer driver 30, port monitor 40 may be established and included in the printer driver 30.

The image forming apparatus 200 may have a communicating interface such as SNMP 210, HTTP 220, and USB 230, and may perform jobs such as print 240, scan 250, and fax 260.

FIGS. 3 to 7 describe the user terminal apparatus 100 according to an exemplary embodiment.

Figure 3:
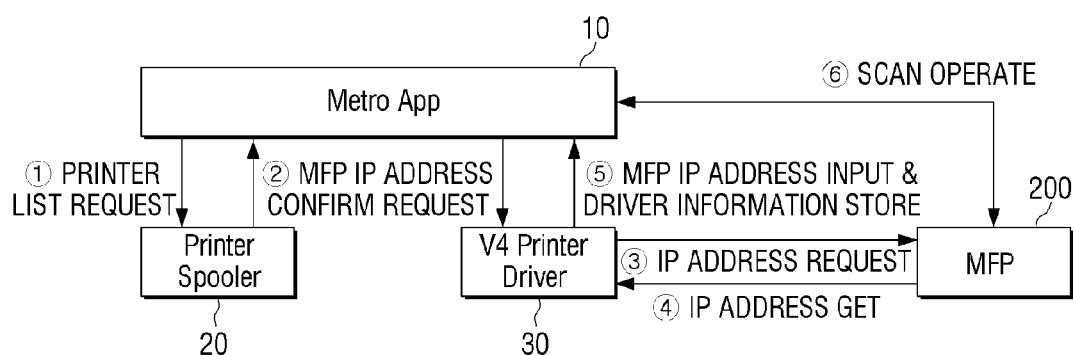
FIG. 3 illustrates an operation to obtain address information of an image forming apparatus connected to a user terminal apparatus according to an exemplary embodiment of the present general inventive concept.
Figure 4:
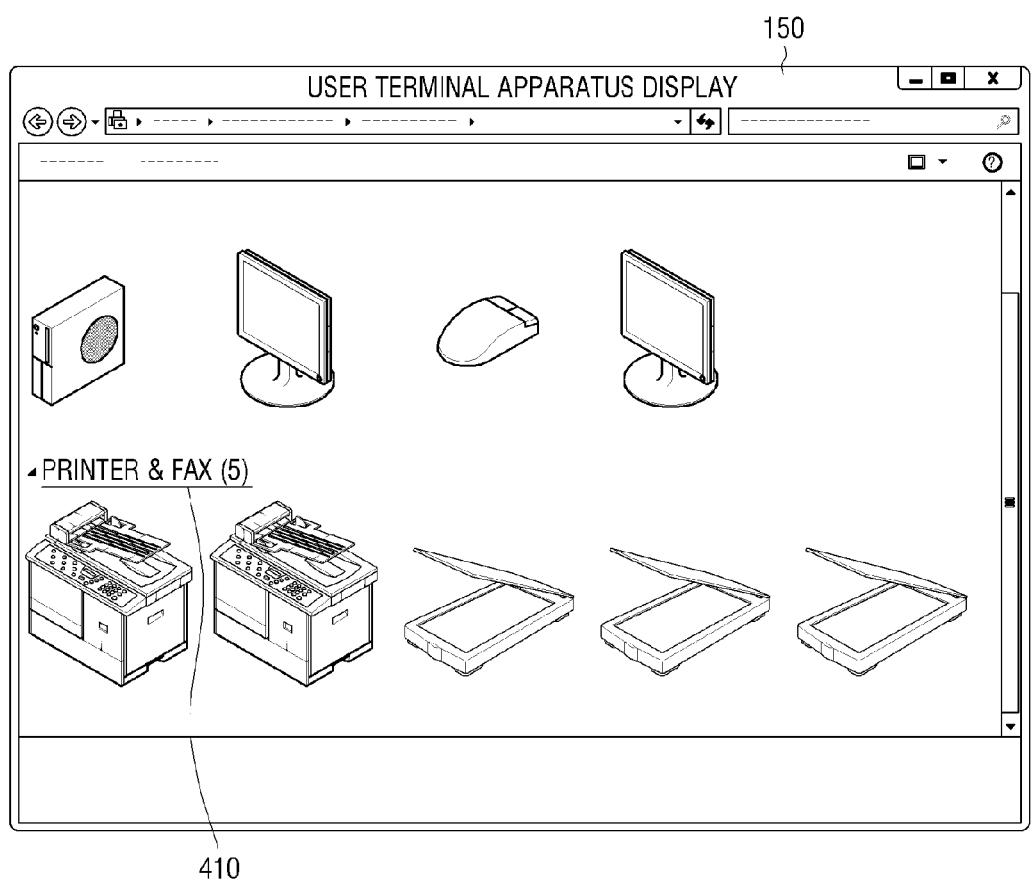
FIG. 4 illustrates a list of image forming apparatuses provided from a printer spooler according to an exemplary embodiment of the present general inventive concept.

FIG. 3 is illustrates an operation of obtaining address information of the image forming apparatuses 200 connected to the user terminal apparatus 100 according to an exemplary embodiment.

By referring to FIG. 3, metro app 10 may receive a list of the image forming apparatuses 200 connected to the user terminal apparatus 100 through the printer spooler 20. In this case, metro app 10 may display a list of the image forming apparatuses in FIG. 4.

Metro app 10 requests confirming address information of the image forming apparatuses 200 to the V4 printer driver 30 by using predefined Bidi communication schema as set forth in Table 1 below.

TABLE 1

```
<bidi:Getxmlns:bidi="http://schemas.microsoft.com/windows/2005/03/
printing/bidi">
  <Query schema='\Printer.Samsung.IPAddress:IPv4List'/>
</bidi:Get>
```

The V4 printer driver 30 may obtain and store address information of the image forming apparatuses 200 in Bidi communication schema of a predefined Bidi XML format as set forth in Table 2 below in response to Bidi communication schema requested from metro app 10.

TABLE 2

```
<?xml version="1.0"?>
<bidi:Schema xmlns:bidi="http://schemas.microsoft.com/windows/2005/
03/printing/bidi">
    <Property name="Printer">
      <Property name ="Samsung">
        <Property name="IPAddress">
          <Value name="IPv4List" oid="1.3.6.1.4.1.236.11.5.1.12.2.5"
deviceIndex="false" type="BIDI_STRING" drvPrinterEvent="true"
refreshInterval="600" />
        </Property>
      </Property>
</bidi:Schema>
```

The V4 printer driver 30 may deliver address information of the image forming apparatuses 200 to metro app 10 according to the Bidi communication schema predefined as set forth in Table 3 below. Address information of the image forming apparatuses 200 are 10.88.190.85, 192.168.1.5, and 192.168.11.4.

TABLE 3

```
<bidi:Get xmlns:bidi="http://schemas.microsoft.com/windows/2005/03/
printing/bidi">
    <Query schema="\Printer.Samsung.IPAddress:IPv4List">
      <Schema name="\Printer.Samsung.IPAddress:IPv4List">
        <BIDI_STRING>10.88.190.85,192.168.1.5,
        192.168.11.4</BIDI_STRING>
      </Schema>
    </Query>
</bidi:Get>
```

Metro app 10 may map status information and address information of the image forming apparatuses 200 as set forth in Table 4 below and store mapped data in a storage.

TABLE 4

| Field name | Description |
| --- | --- |
| ID | Device ID |
| Name | |
| PrinterPortName | Port name of Printer |
| IsV4Driver | Whether to find Customized v4 Driver |

TABLE 4-continued

| Field name | Description |
| --- | --- |
| IsBidiSupported | which can get IP Address |
| IPAddress | IP Address |
| ... (and so on) ... | ... (and so on) ... |

If a user drives metro app 10 and performs a scan function, metro app 10 may directly transmit a command to perform a scan job to the image forming apparatus 200 without utilizing the V4 printer driver 30 by using another network module with address information of the image forming apparatus 200 stored in a storage, which is explained above, and thus obtain scan data. Yet another network module indicates a module directly communicating with the image forming apparatus 200 by using protocols such as SNMP and HTTP.

If the predefined V4 printer driver 30 is not installed in the user terminal apparatus 100 or if the above Bidi communication schema is not supported, address information and status information may not be obtained.

Figure 5:
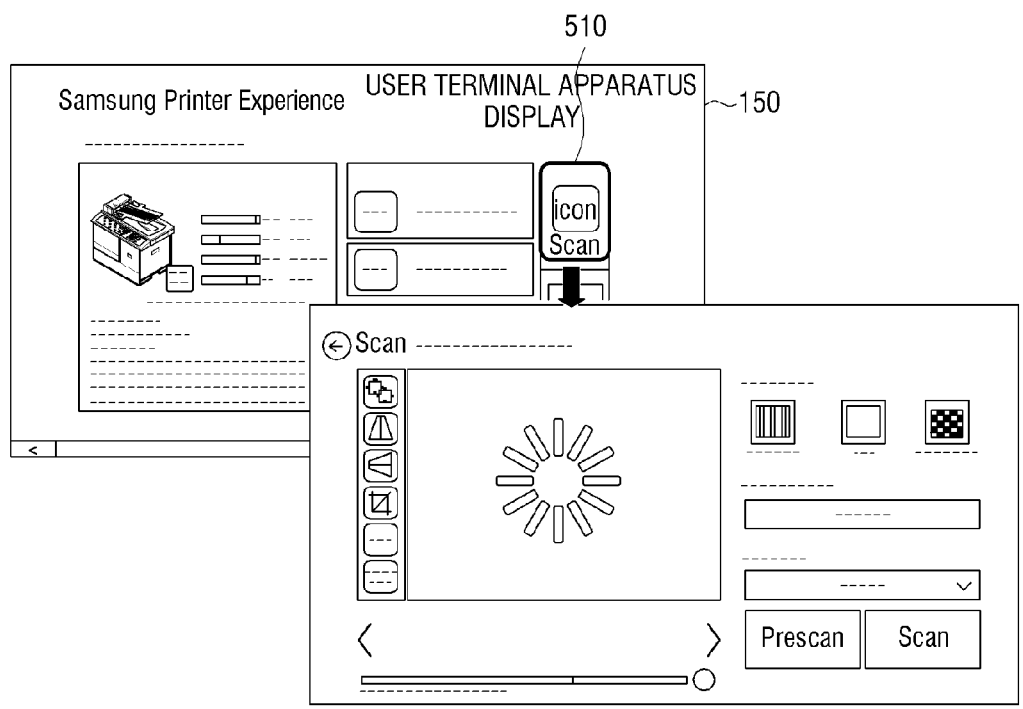
FIG. 5 illustrates an exemplary operation of performing scan jobs on a user terminal apparatus according to an exemplary embodiment of the present general inventive concept.

If the supporting V4 printer driver 30 and the above predefined Bidi communication schema are utilized, metro app 10 may be displayed as a list of devices supporting a scan function as is set forth in FIG. 5, and a scan function 510 may be activated.

The user terminal apparatus 100 according to an exemplary embodiment illustrated in FIG. 3 may get address information of the image forming apparatus 200 connected to an O/S that does not provide address information of the image forming apparatus 200 directly, and may provide the address information to an application performing a scan job.

Figure 6:
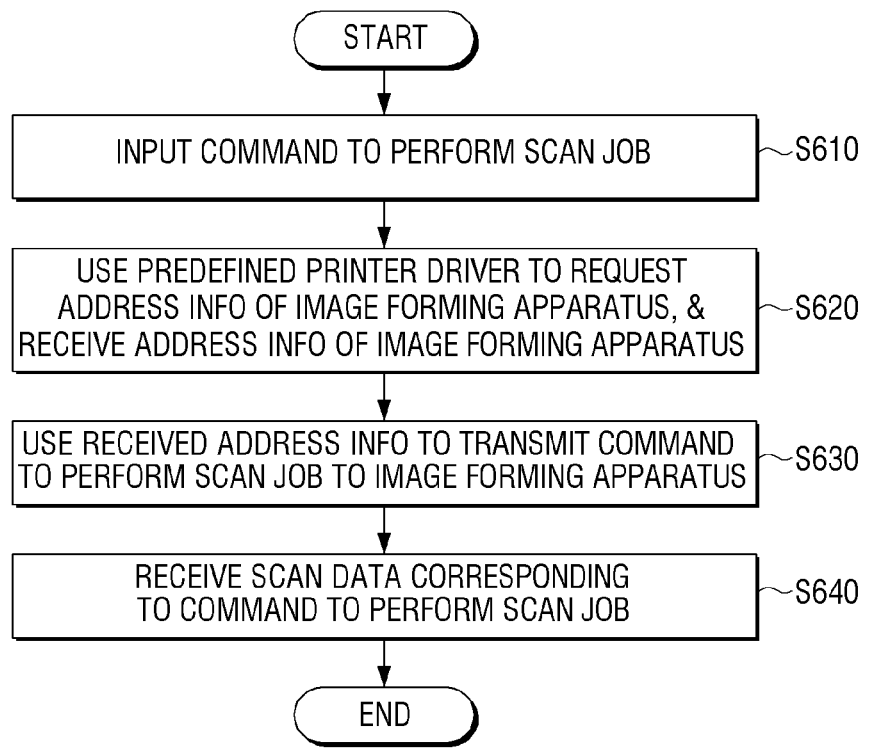
FIG. 6 is a flowchart illustrating a method of controlling a user terminal apparatus according to an exemplary embodiment of the present general inventive concept.

FIG. 6 is a flowchart illustrating a control method according to an exemplary embodiment.

Referring to FIG. 6, if a command to perform a scan job of the image forming apparatus 200 is inputted at S610, the user terminal apparatus 100 requests address information of the image forming apparatus 200 by utilizing a predefined printer driver and receives address information of the image forming apparatus 200 at operation S620.

The predefined printer driver may be a printer driver supporting predefined Bidi communication schema.

Status information of the image forming apparatus 200, as well as address information of the image forming apparatus 200, may be requested and received. The status information may include at least one of network information, supportable job information, and component consumption information regarding the image forming apparatus 200.

Based on the received address information, a command to perform a scan job is transmitted to the image forming apparatus 200 at operation S630.

The user terminal apparatus 100 may utilize another network module that is different from the predefined printer driver and may transmit the command to perform a scan job. This network module is already explained by referring to FIG. 1 above, which will not be repeated.

According to the received status information of the image forming apparatus 200, a user interface window to receive selection of scan options may be displayed. Further, a selection of scan options may be transmitted to the image forming apparatus 200 with a command to perform the scan job.

At operation S640, scan data corresponding to the command to perform the scan job is received from the image forming apparatus 200.

The user terminal apparatus 100 may operate in Windows® 8.

The method controlling a user terminal apparatus of FIG. 6 may be implemented in the user terminal apparatus 100 illustrated in FIG. 1, or by any other suitable device that may carry out the exemplary embodiments of the present general inventive concept disclosed herein.

Figure 7:
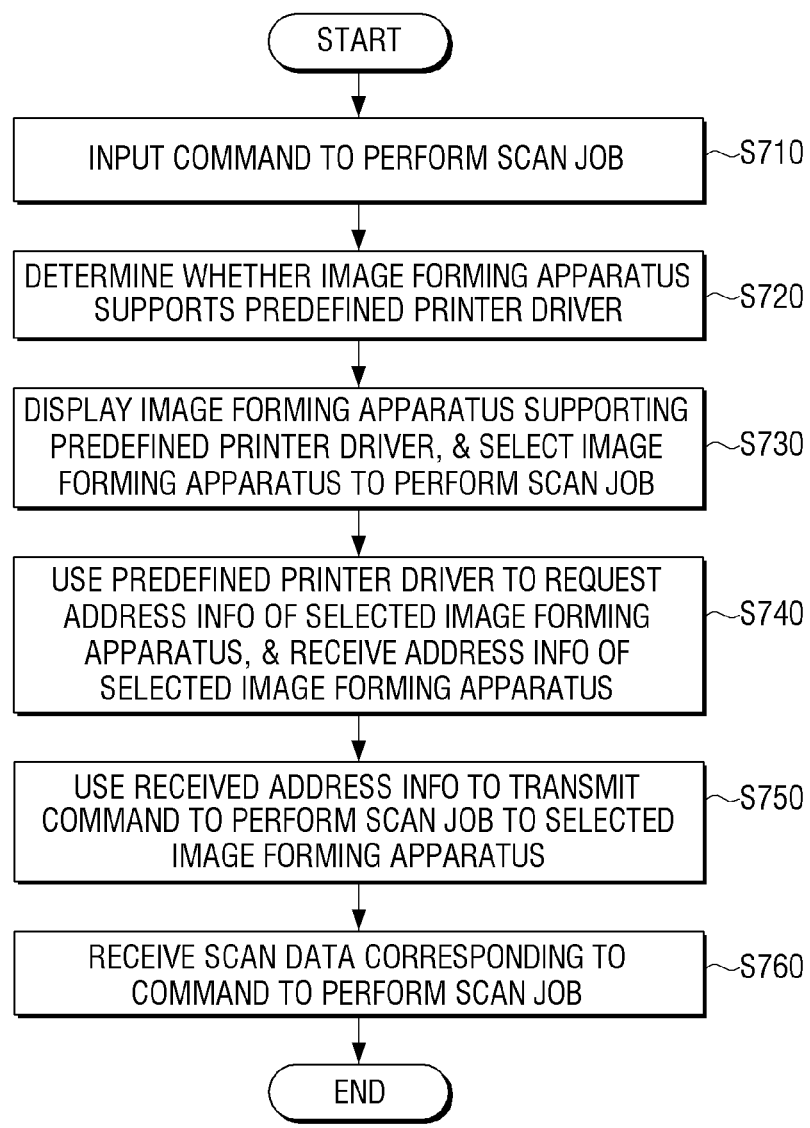
FIG. 7 is a flowchart illustrating a method of controlling a user terminal apparatus according to an exemplary embodiment of the present general inventive concept.

FIG. 7 is a flowchart illustrating a control method according to an exemplary embodiment.

Referring to FIG. 7, if a command to perform a scan job of the image forming apparatus 200 is received at operation S710, the user terminal apparatus 100 determines whether the image forming apparatus 200 supports a predefined printer driver at operation S720.

As a result of the determination that the image forming apparatus 200 supports the predefined printer driver, the image forming apparatus 200 supporting the predefined printer driver is displayed, and the image forming apparatus 200 to perform a command to perform a scan job is selected at operation S730.

By utilizing the predefined printer driver, address information of the selection of the image forming apparatus 200 is requested, and address information of the selection of the image forming apparatus 200 is received at operation S740.

The predefined printer driver may be a printer driver to support predefined Bidi communication schema.

As well as address information of the image forming apparatus 200, status information of the image forming apparatus 200 may be requested and received. The status information may include at least one of network information, supportable job information and component consumption information regarding the image forming apparatus 200.

At operation S750, based on the received address information, the command to perform the scan job of the selection of the image forming apparatus 200 is transmitted.

According to the received status information of the image forming apparatus 200, a user interface window to receive the selection of scan options may be displayed, and the selection of the scan options may be transmitted to the image forming apparatus 200 with the command to perform the scan job.

At S760, scan data corresponding to the command to perform the scan job is received from the image forming apparatus 200.

The user terminal apparatus 100 may operate in Windows® 8.

The method of controlling a user terminal apparatus in FIG. 7 may be implemented in the user terminal apparatus 100 having units of FIG. 1 or other units.

The method of controlling the user terminal apparatus 100 according to the exemplary embodiment may obtain address information of the image forming apparatus 200 connected to an O/S that does not directly provide address information of the image forming apparatus 200, and may provide the address information to application performing scan job.

In the following, by referring to FIGS. 8 to 14, the user terminal apparatus 100 according to another exemplary embodiment will be explained.

Figure 8:
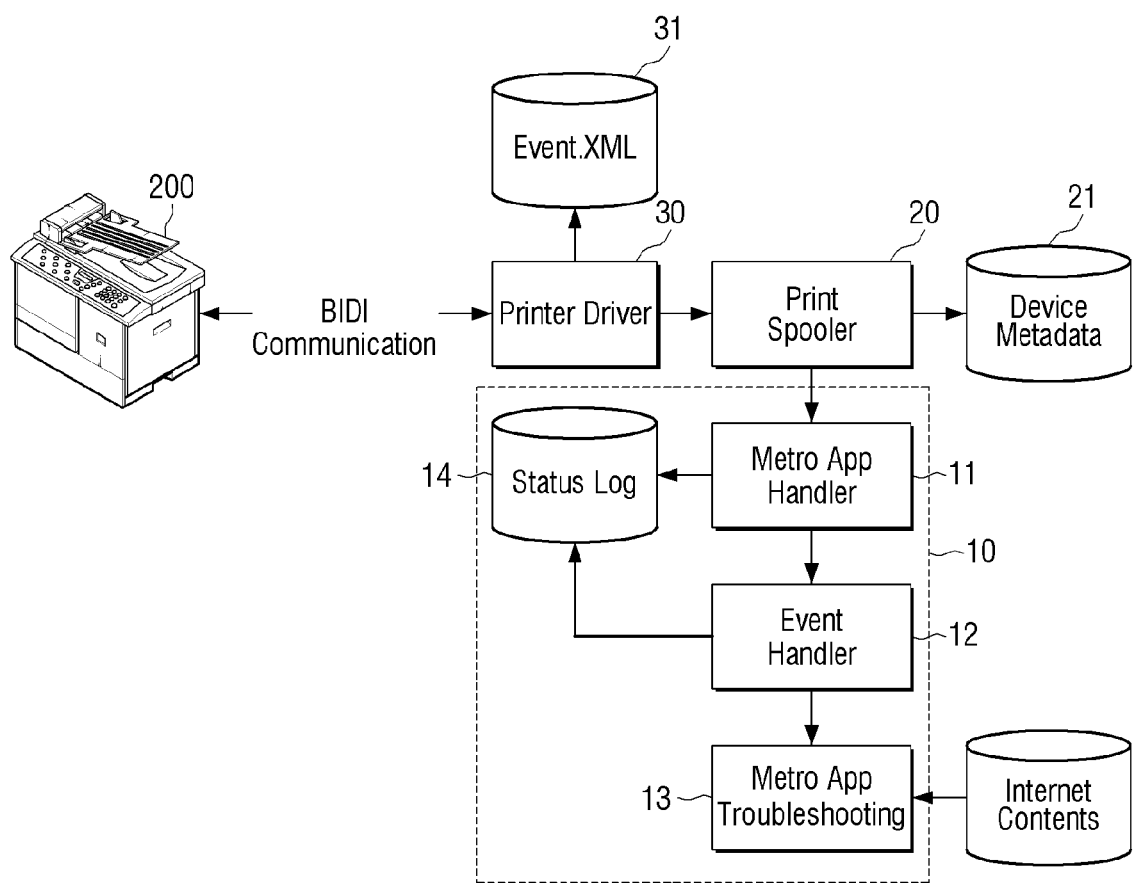
FIG. 8 illustrates a process of providing information statuses in a metro style UI environment of Windows® 8 according to an exemplary embodiment of the present general inventive concept.

FIG. 8 illustrates a status information process provided in a metro style UI environment of Windows® 8.

Referring to FIG. 8, programs implemented in the user terminal apparatus of FIG. 2 are further divided to perform more functions as described below.

Printer driver 30 may provide a status information event based on status information received from the image forming apparatus 200 by connecting data of event XML 31. In other words, the structure may only provide status notification of the image forming apparatus 200 provided by printer driver 30. For example, the value, "2202," is processed as "DoorOpen" in event XML of Table 5 below.

TABLE 5

```
<?xml version="1.0" encoding="utf-8" ?>
- <de:DriverEvents
xmlns:de="http://schemas.microsoft.com/windows/2011/08/printing/
driverevents" schemaVersion="4.0">
- <DriverEvent eventId="{2D39BF93-0838-4DA9-8E28-
E18041E49E14}">
    <Transport>WSD</Transport>
    <Transport>SNMP</Transport>
    <Query>\Printer.Status</Query>
- <Trigger result="\Printer.Status.Summary:StateReason"
comparison="EqualTo" value="DoorOpen">
    <StandardMessage resourceId="2202" />
  </Trigger>
- <Trigger result="\Printer.Status.Summary:StateReason"
comparison="EqualTo" value= "MarkerFailure">
    <StandardMessage resourceId="2505" />
  </Trigger>
- <Trigger result="\Printer.Status.Summary:StateReason"
comparison="EqualTo" value="MarkerSupplyEmpty">
    <StandardMessage resourceId="1805" />
  </Trigger>
- <Trigger result="\Printer.Status.Summary:StateReason"
comparison="EqualTo" value="MediaEmpty">
    <StandardMessage resourceId="1501" />
  </Trigger>
- <Trigger result="\Printer.Status.Summary:StateReason"
comparison="EqualTo" value="MediaJam">
    <StandardMessage resourceId="1402" />
  </Trigger>
- <Trigger result="\Printer.Status.Summary:StateReason"
comparison="EqualTo" value="MediaNeeded">
    <StandardMessage resourceId="1701" />
  </Trigger>
- <Trigger result="\Printer.Status.Summary:StateReason"
comparison="EqualTo" value="OutputAreaFull">
    <StandardMessage resourceId="1601" />
  </Trigger>
- <Trigger result="\Printer.Status.Summary:StateReason"
comparison="EqualTo" value="AttentionRequired">
    <StandardMessage resourceId="1007" />
  </Trigger>
- <Trigger result="\Printer.Status.Summary:StateReason"
comparison="EqualTo" value="Paused">
    <StandardMessage resourceId="2600" />
  </Trigger>
  </DriverEvent>
  </de:DriverEvents>
```

To process a status, event XML 31 of printer driver 30 may compare "EqualTo," "NotEqualTo," "GreaterThan," and "LessThan" only. Thus, if a status may not be processed with the above four conditions, for instance, toner value, status information may not be provided to a user.

Spooler 20 illustrated in FIG. 8 may be the printer spooler 20 of FIG. 2 as described above, receives a status information event of printer driver 30, and provides the event to metro app 10. The spooler 20 is connected to device metadata 21 and may manage a whole process of the image forming apparatus 200.

Metro app 10 may analyze the status information event delivered from spooler 20, display status information to a user, and perform an operation of connecting to a troubleshooting page. Specifically, general operations of metro app 10 may be controlled by metro app handler 11, and an operation of displaying status information may be controlled by event handler 12. Controlling operations of metro app handler 11 and event handler 12 may be recorded by status log 14. Metro app troubleshooting 13 may control connecting a troubleshooting page by utilizing internet contents.

In the above descriptions, the process of FIG. 8 provides status information to a user in a metro style UI environment of Windows® 8; however, because only a status message previously stored in event XML 31 files connected to printer driver 30 is processed, the process has the limitation that various conditions of statuses may not be provided to a user.

In the following, status information of the user terminal apparatus 100 that overcomes the above limitations will be explained.

Figure 9:
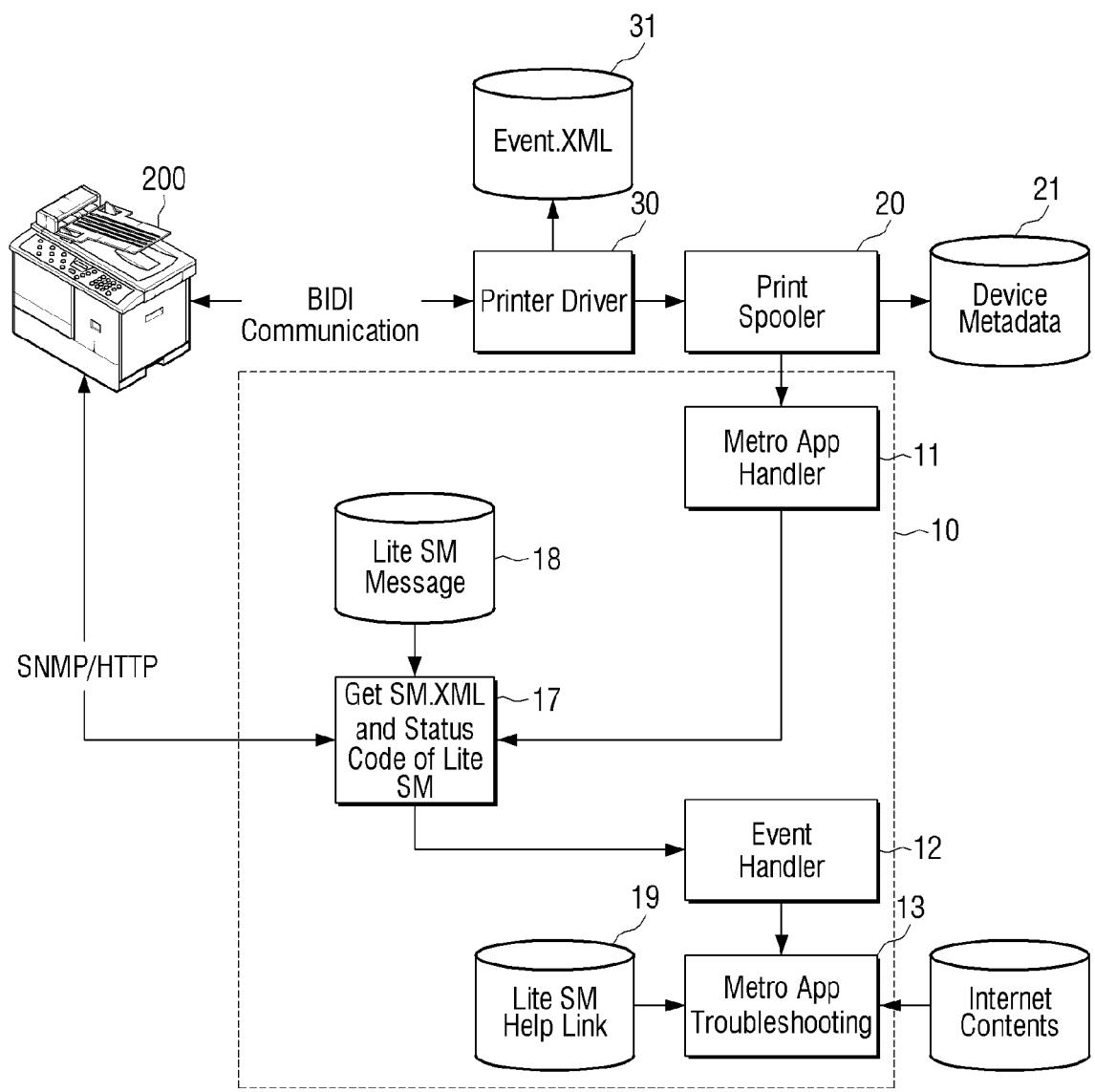
FIG. 9 illustrates an exemplary operation of providing a status information on a user terminal apparatus according to another exemplary embodiment of the present general inventive concept.

FIG. 9 illustrates a status information operation of the user terminal apparatus 100 according to another exemplary embodiment.

By referring to FIG. 9, printer driver 30 and spooler 20 may provide a status information event to metro app 10 based on a status message received from the image forming apparatus 200 by being connected to event XML 31, as described above in connection with FIG. 8.

In this exemplary embodiment, the status message received from printer driver 30 may be a first status message of FIG. 1.

If the status information event occurs, metro app 10 obtains address information of the image forming apparatus 200 from a status message transmitted from printer driver 30 according to controlling of metro app handler 11.

Communicating module 17 of metro app 10 may use obtained address information, and may request a detailed status message in stored XML format 18. The communicating module 17 may directly communicate with the image forming apparatus 200 by utilizing protocols such as SNMP and HTTP, and a detailed status message may be a second status message of FIG. 1. Table 6 below shows an implementing example of a detailed status message. The detailed status message in XML format may provide an English string, a status code, or a troubleshooting key (general message (MSG)) regarding each status. A status code may be analyzed as "attributes of status" explained in FIG. 1.

TABLE 6

- <Status>
- <Ready GeneralMSG="Ready" STRING="Ready">
    <Mask>[00][FF][FF][00][00][00][00][00]</Mask>
    <Status>[81][01][01][FF][FF][FF][FF][FF]</Status>
  </Ready>

TABLE 6-continued

- <Printing GeneralMSG="Printing" STRING="Printing...">
    <Mask>[00][FF][FF][00][00][00][00][00]</Mask>
    <Status>[81][01][04][FF][FF][FF][FF][FF]</Status>
  </Printing>
- <Warmingup GeneralMSG="Waiting" STRING="Warming up... Please wait few minutes.">
    <Mask>[00][FF][FF][00][00][00][00][00]</Mask>
    <Status>[83][01][05][FF][FF][FF][FF][FF]</Status>
  </Warmingup>
- <Processing GeneralMSG="Waiting" STRING="Processing">
    <Mask>[00][FF][FF][00][00][00][00][00]</Mask>
    <Status>[81][01][0B][FF][FF][FF][FF][FF]</Status>
  </Processing>
- <PowerSave GeneralMSG="PowerSave" STRING="Sleeping...">
    <Mask>[00][FF][FF][00][00][00][00][00]</Mask>
    <Status>[81][01][03][FF][FF][FF][FF][FF]</Status>
  </PowerSave>

Metro app 10 may receive the detailed status message as set forth in the above example, and may perform an operation of displaying status information by event handler 12.

If a connecting troubleshooting page is inputted by the user, metro app troubleshooting 13 may utilize a model name and a status code of the image forming apparatus 200 extracted from a detailed status message, obtain troubleshooting page information from data of Lite SM Help Link 19, and provide the information to a user. Specifically, troubleshooting page information of Lite SM Help Link 19 provides a link of with respect to a problem and problem solution information with XML information as is set forth in an example of Table 7 below.

TABLE 7

<TroubleshootingList modelname="Samsung SCX-483x 5x3x Series" indexfile="start_here.htm">
  <Troubleshooting name="Offline" target="advanced/offline.htm" />
  <Troubleshooting name="PaperEmpty" target="basic/media_and_tray.htm#tray" />
  <Troubleshooting name="PaperLow" target="basic/media_and_tray.htm#tray" />
  <Troubleshooting name="PaperMP" target="basic/media_and_tray.htm#mp" />
  <Troubleshooting name="JamMP" target="basic/jam.htm#jammp" />
  <Troubleshooting name="JamTray1" target="basic/jam.htm#jamtray1" />
  <Troubleshooting name="JamTrayN" target="basic/jam.htm#jamtray2" />
  <Troubleshooting name="JamInside" target="basic/jam.htm#jaminside" />
  <Troubleshooting name="JamExitArea" target="basic/jam.htm#jamexitarea" />
  <Troubleshooting name="Jam0Duplex" target="basic/jam.htm#jamduplex" />
  ...
  <Troubleshooting name="MarkerSupplyEmpty" target="basic/replacetoner.htm" DriverStatus="True" ResourceID="1805" />
  <Troubleshooting name="MediaEmpty" target="basic/media_and_tray.htm" DriverStatus="True" ResourceID="1501" />
  <Troubleshooting name="MediaJam" target="basic/jam.htm" DriverStatus="True" ResourceID="1402" />
  <Troubleshooting name="MediaNeeded" target="basic/media_and_tray.htm" DriverStatus="True" ResourceID="1701" />
  <Troubleshooting name="OutputAreaFull" target="basic/media_and_tray.htm" DriverStatus="True" ResourceID="1601" />
  <Troubleshooting name="AttentionRequired" target="basic/troubleshooting.htm" DriverStatus="True" ResourceID="1007" />
  <Troubleshooting name="Paused" target="basic/troubleshooting.htm" DriverStatus="True" ResourceID="2600" />
  <Troubleshooting name="Default" target="basic/troubleshooting.htm" />
</TroubleshootingList>

Figure 10:
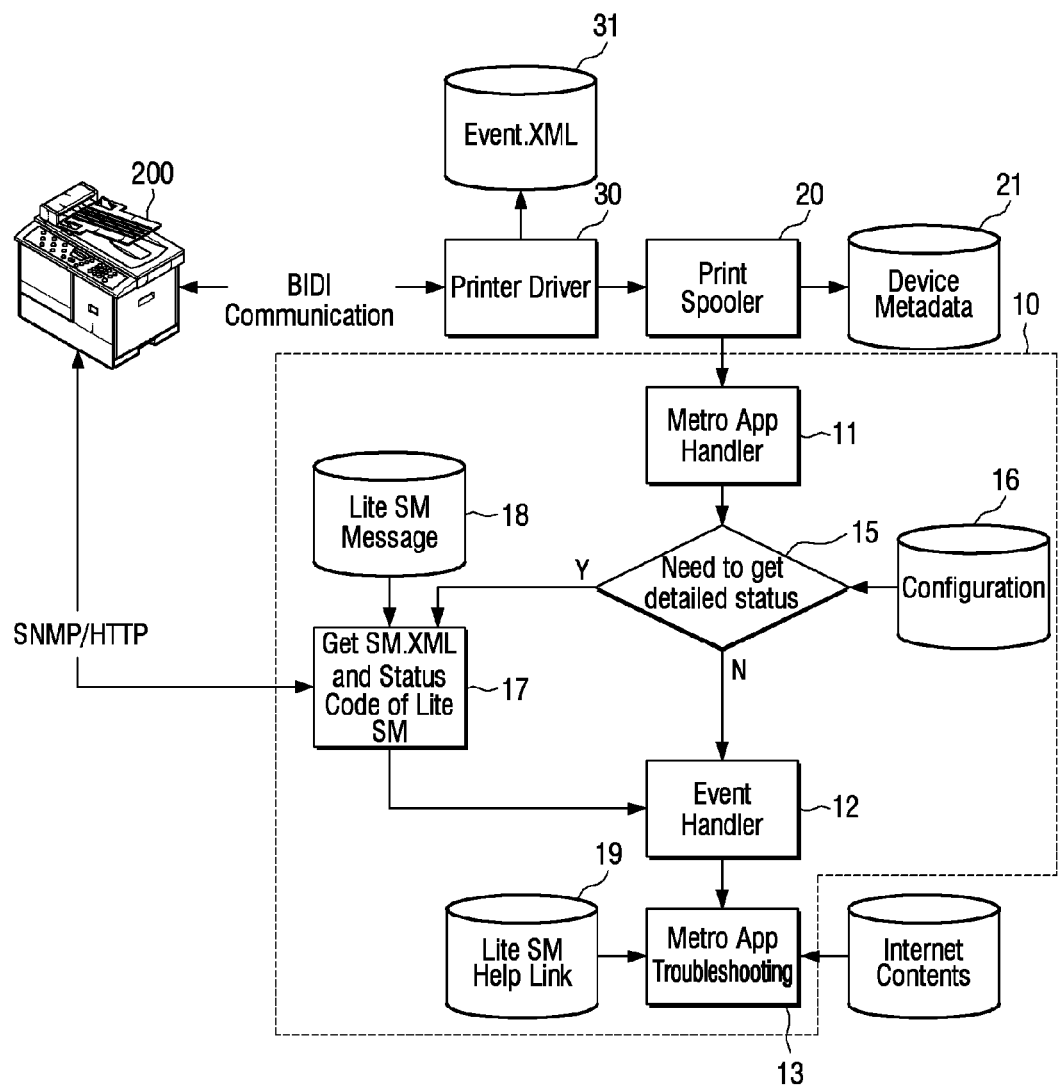
FIG. 10 illustrates an exemplary operation of providing a status information on a user terminal apparatus according to an exemplary embodiment of the present general inventive concept.

FIG. 10 illustrates a status information operation of the user terminal apparatus 100 according to an exemplary embodiment which includes a determiner 15 of metro app 10.

Referring to FIG. 10, the determiner 15 of metro app 10 may determine whether to request a detailed status message (i.e., request a second status message). Specifically, according to types of the status message delivered from the printer driver 30, the determiner 15 may determine whether to request a detailed status message. For example, if the image forming apparatus 200 is in a "DoorOpen" status, an information status and troubleshooting may be provided as is provided when the image forming apparatus 200 is in a "DoorOpen" status without requesting another detailed status message. However, if the image forming apparatus 200 is in a "PaperEmpty" status, a detailed status message may be requested to determine which paper feeder is reporting the status.

Types of status messages that indicate a detailed status message may be stored in storage area Configuration 16 and provided during determining. Table 8 below is an example of Configuration 16. In the below example, because GetDetailedStatus is No if the image forming apparatus 200 is in an offline status, a detailed status message is not requested. Because GetDetailedStatus is Yes if the image forming apparatus 200 is in a paperempty status, a detailed status message is requested.

TABLE 8

<StatusConfiguration modelname="Samsung SCX-483x 5x3x Series">
    <Status DriverEvent="Offline" GetDetailedStatus="No" />
    <Status DriverEvent="PaperEmpty" GetDetailedStatus="Yes" />
...
</StatusConfiguration>

Storage area Configuration 16 may be defined by manufacturers of a metro app 10 or by a user.

The above determiner 15 of metro app 10 may request detailed status messages again regarding all status messages delivered from the printer driver 30 as in FIG. 8, and supplemental consuming of system resources and network resources which is occurring.

Figure 11:
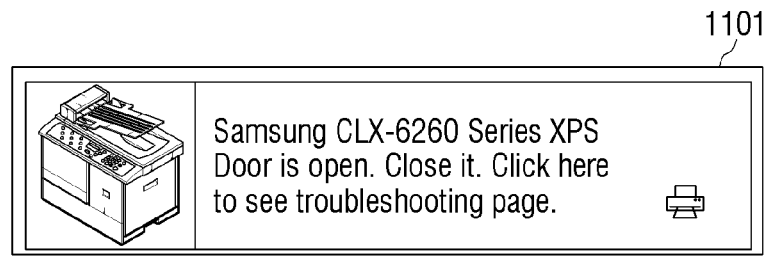
FIG. 11 illustrates a pop-up display according to an exemplary embodiment of the present general inventive concept.

FIG. 11 illustrates displaying a pop-up format according to an exemplary embodiment.

Referring to FIG. 11, according to a status message of the image forming apparatus 200, an interface window 1101 may be created and displayed in a pop-up format on a part of a background screen in an O/S. If user manipulation to select an interface window 1101 is inputted, the user terminal apparatus 100 may create and display a troubleshooting page. That is, as illustrated in FIG. 11, the user is instructed to click on the tile that indicates that the door is open, and a troubleshooting page listing possible solutions to the open door problem will be displayed.

Figure 12:
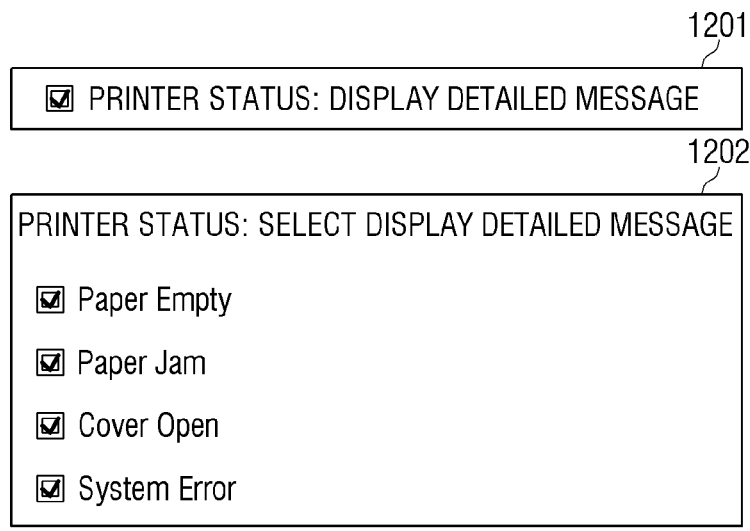
FIG. 12 illustrates a user establishing operation according to an exemplary embodiment of the present general inventive concept.

FIG. 12 illustrates a user establishing operation according to an exemplary embodiment.

Referring to FIG. 12, a user may receive the status message delivered through the printer driver 30 and a display status information without utilizing the determiner 15 of FIG. 10 (see status message 1201 of FIG. 12).

When utilizing the determiner 15 of FIG. 10, a user may set types of status messages to request a detailed status message (see status message 1202 of FIG. 12). Setting values may be stored in configuration 16 of FIG. 10.

Figure 13:
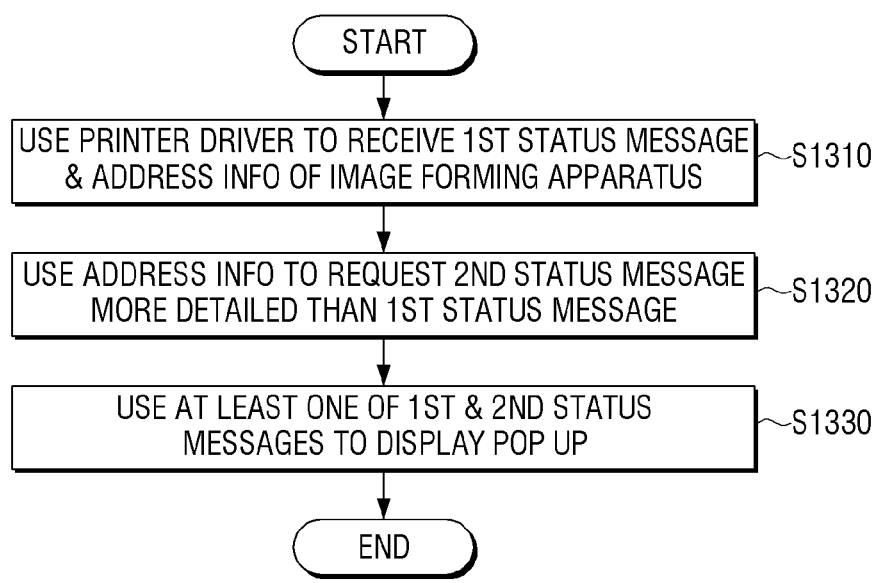
FIG. 13 is a flowchart illustrating a method of controlling a user terminal apparatus according to an exemplary embodiment of the present general inventive concept.

FIG. 13 is a flowchart illustrating a method of controlling the user terminal apparatus 100 according to an exemplary embodiment.

Referring to FIG. 13, the user terminal apparatus 100 uses a printer driver of the image forming apparatus 200, and receives a first status message and address information of the image forming apparatus 200 at operation S1310.

The first status message is a message predefined by the printer driver, and defined in the event XML of the printer driver. It may be the status message explained above in connection with FIG. 9.

The user terminal apparatus 100 uses the received address information and requests a second status message that is more detailed than the first status message to the image forming apparatus 200 at operation S1320.

The second status message may be the detailed status message explained above in connection with FIG. 9.

The second status message may include at least one attribute of a warning, an error and information regarding a status of the image forming apparatus 200. If status attributes extracted from the second status message are not a warning or an error, a second status message may be requested again after a delay of a predetermined time.

At operation S1330, the user terminal apparatus 100 utilizes at least one of the first and second status messages and displays the message in a pop-up format.

The method of controlling a user terminal apparatus of FIG. 13 may be implemented in the user terminal apparatus 100 as illustrated in FIG. 1 and described above, or other units that may carry out the exemplary embodiments of the present general inventive concept as disclosed herein.

Figure 14:
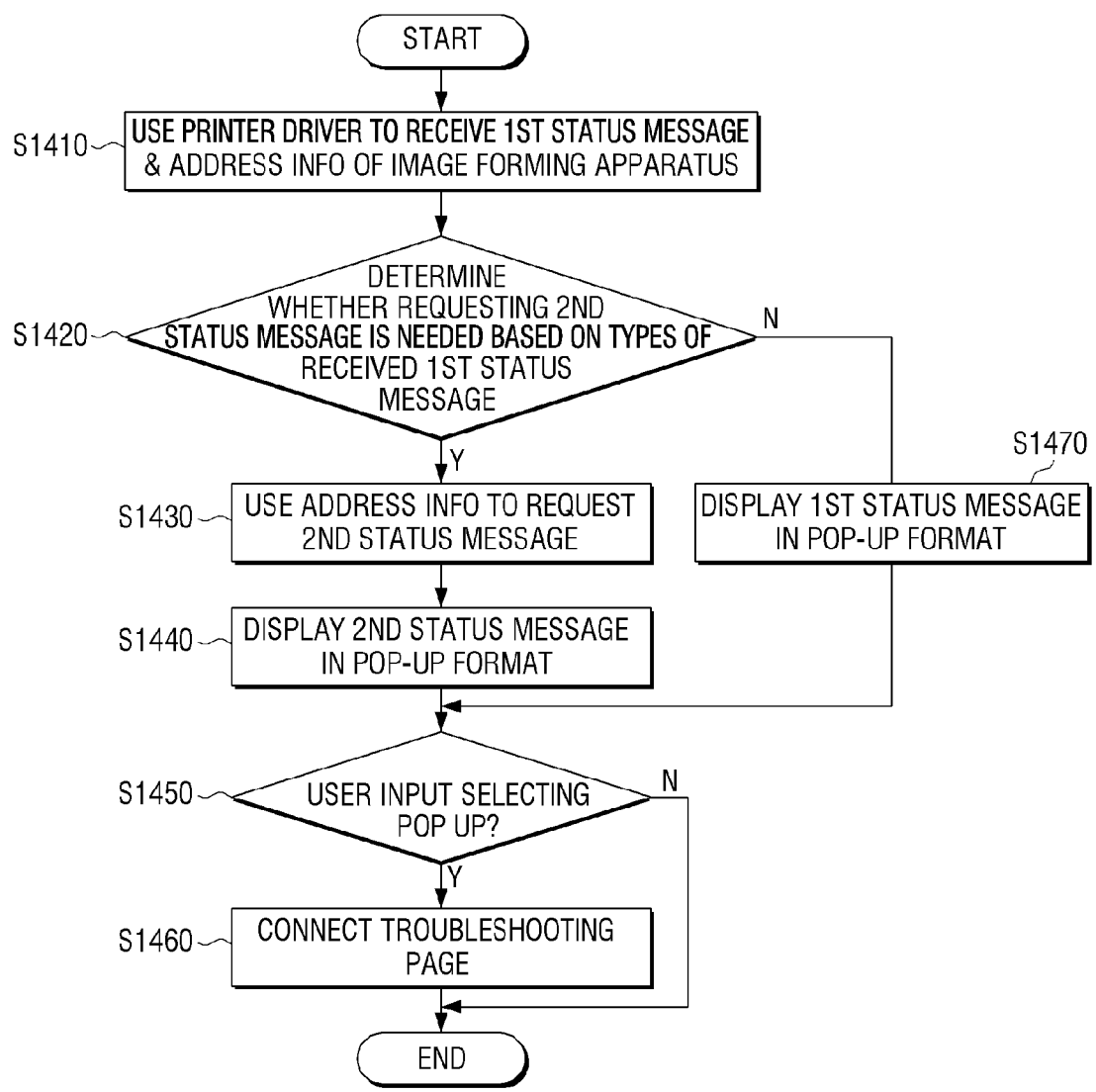
FIG. 14 is a flowchart illustrating a method of controlling a user terminal apparatus according to an exemplary embodiment of the present general inventive concept.

FIG. 14 is a flowchart illustrating a method of controlling the user terminal apparatus according to an exemplary embodiment. FIG. 14 describes a control method of FIG. 13 together with determining a second status message and connecting a troubleshooting page.

Referring to FIG. 14, the user terminal apparatus 100 uses a printer driver of the image forming apparatus 200 and receives a first status message and address information of the image forming apparatus at operation S1410.

The first status message is a message predefined by the printer driver, and defined in the event XML of the printer driver. The first status message may be the status message explained in FIG. 9.

At operation S1420, the user terminal apparatus 100 may determine whether requesting a second status message is required according to types of the received first status message.

The determining process is explained in detail above in connection with the determining of FIG. 11.

If determining that a second status message is required at operation S1420:Yes, a user may request a second status message by utilizing the received address information of the image forming apparatus 200 at operation S1430. A second status message may be displayed in a pop-up format at operation S1440.

If it is determined that a second status message is not required at operation S1420:No, the user terminal apparatus 100 may display the received first status message in a pop-up format at operation S1470.

If a user inputs selecting the pop-up message at operation S1450:Yes, the user terminal apparatus 100 may connect a troubleshooting page at operation S1460, which provides problem solution information for specified problems such as, for example, providing an address to connect to an image forming apparatus that has a sufficient amount of toner to complete a job.

The method of controlling a user terminal apparatus in FIG. 14 may be implemented by the user terminal apparatus 100 illustrated in FIG. 1 and detailed above or other units that may carry out the exemplary embodiments of the present general inventive concept disclosed herein.

The above control method of the user terminal apparatus 100 according to an exemplary embodiment may receive a detailed status message of the image forming apparatus 200 in an O/S having not receiving certain information on the status of the image forming apparatus 200, and may provide information statuses regarding an error or a warning of the image forming apparatus 200 to a user.

In the following, by referring to FIGS. 15 to 27, the user terminal apparatus 100 according to another exemplary embodiment will be explained.

Before explaining FIG. 15, a tile supported in a metro style UI environment of Windows® 8 is described below.

Figure 18:
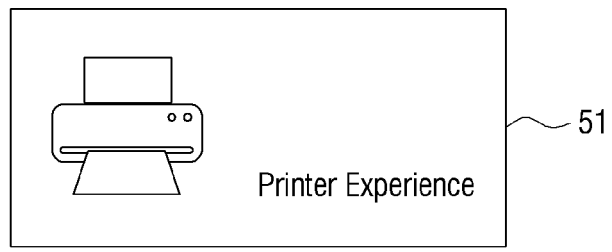
FIG. 18 illustrates a main tile created on a background/start screen on a user terminal apparatus when installing the application in a metro style UI environment of an operating system according to an exemplary embodiment of the present general inventive concept.

A tile is a rectangle or a square shape of an icon used for a background screen (or a start screen) in a metro style UI environment of Windows® 8, and has a linking function to move to an application, a website, an address book or other items. Unlike conventional icons, a tile may display changed information of each connected item on a real time basis, and for example, may display the number of unread messages in a letter box on a real time basis. A tile has two types, which are classified into an application tile (a main tile) and a secondary tile. An application tile (a main tile) is created when installing an application, and a secondary tile is additionally created by the user. FIG. 18 shows an example of an application tile (a main tile), and describes a shape of a mail tile 51 of an application performing an image forming job.

Figure 19:
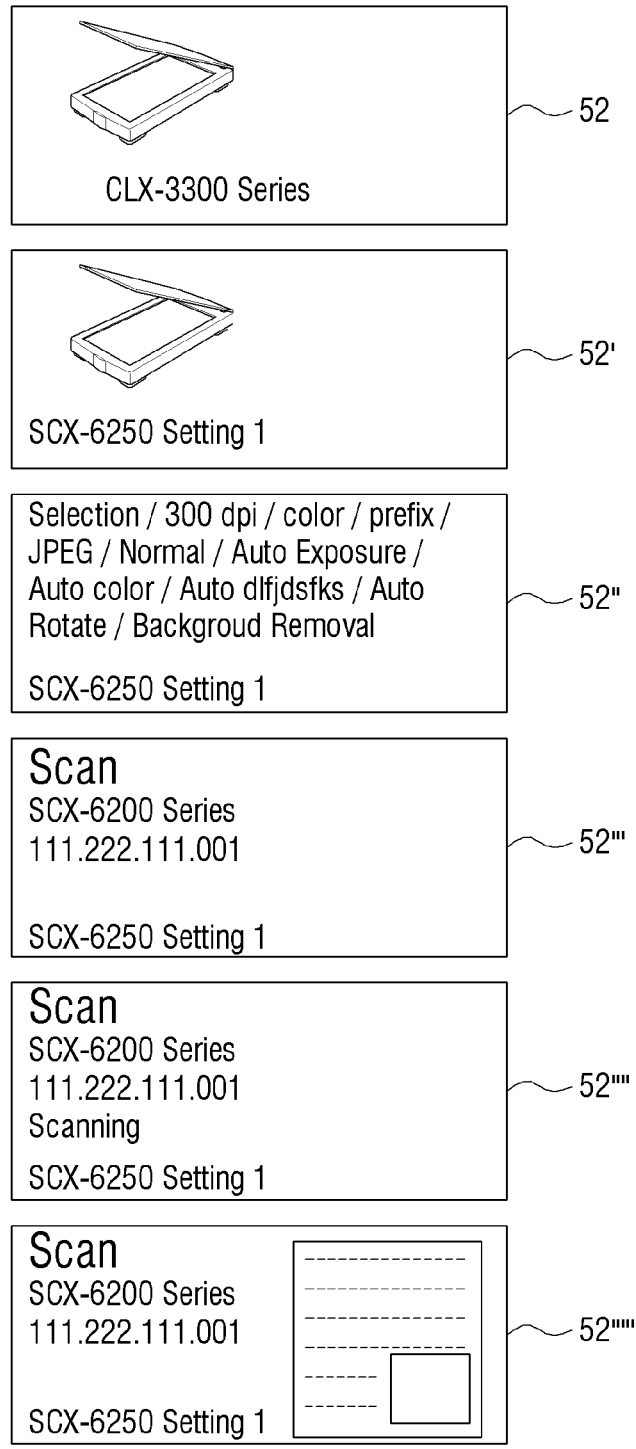
FIG. 19 illustrates a secondary tile to display, on a user terminal apparatus, a specific page of an application corresponding to a selected main tile in a metro style UI environment of an operating system according to an exemplary embodiment of the present general inventive concept.

FIG. 19 illustrates various examples of secondary tiles. A secondary tile may be designed as tile marking (image, model name) 52, tile marking (image, model name, setting number) 52', tile marking (model name, setting number, setting information) 52", tile marking (job type, model name, address information, setting number) 52''', tile marking (job type, model name, address information, job processing status, setting number) 52'''', and tile marking (job type, model name, address information, setting number, job performing results) 52'''''. A job processing status and job performing results may be showed and delivered by a tile on a real time basis.

Figure 16:
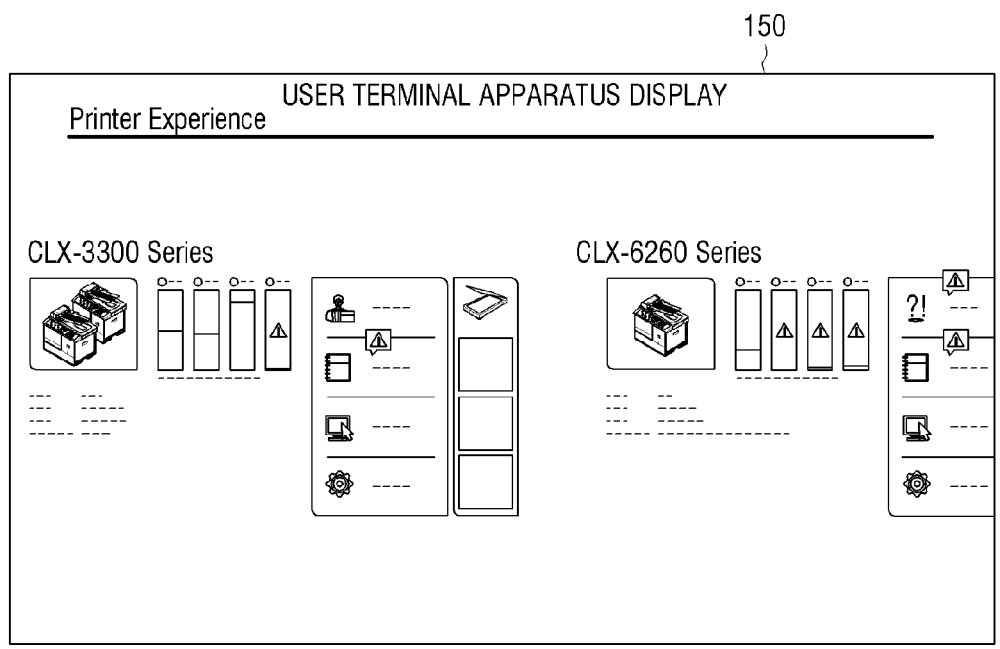
FIG. 16 illustrates a main page according to an exemplary embodiment of the present general inventive concept.

Specifically, if an application tile (a main tile) is selected by a touch or a click, the application tile may perform a corresponding application. Implementing an application launches a display of a main page of a corresponding application. FIG. 16 illustrates a main page according to an exemplary embodiment, and describes a main page displayed when performing a scan application.

Figure 17:
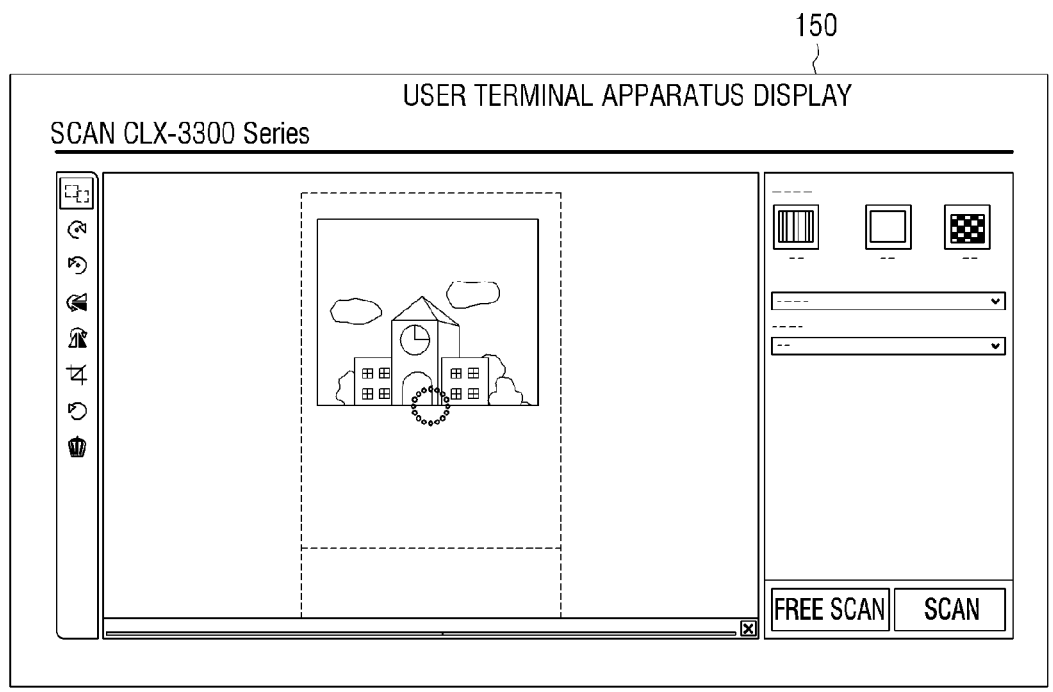
FIG. 17 illustrates a job implementing page according to an exemplary embodiment of the present general inventive concept.

If a secondary tile is selected by a touch or a click, the secondary tile may show a specific page of a corresponding application, or the secondary tile may link to a specific page number of an application. In other words, the secondary tile displays a specific page of a corresponding application. FIG. 17 illustrates a job performing page according to an exemplary embodiment, that illustrates a scan job performing page of the image forming apparatus 200 selected in a scan application.

In the following, for convenience, an application tile is defined as a main tile and an exemplary embodiment of a job of the image forming apparatus 200 that is a scan job will be described.

Figure 15:
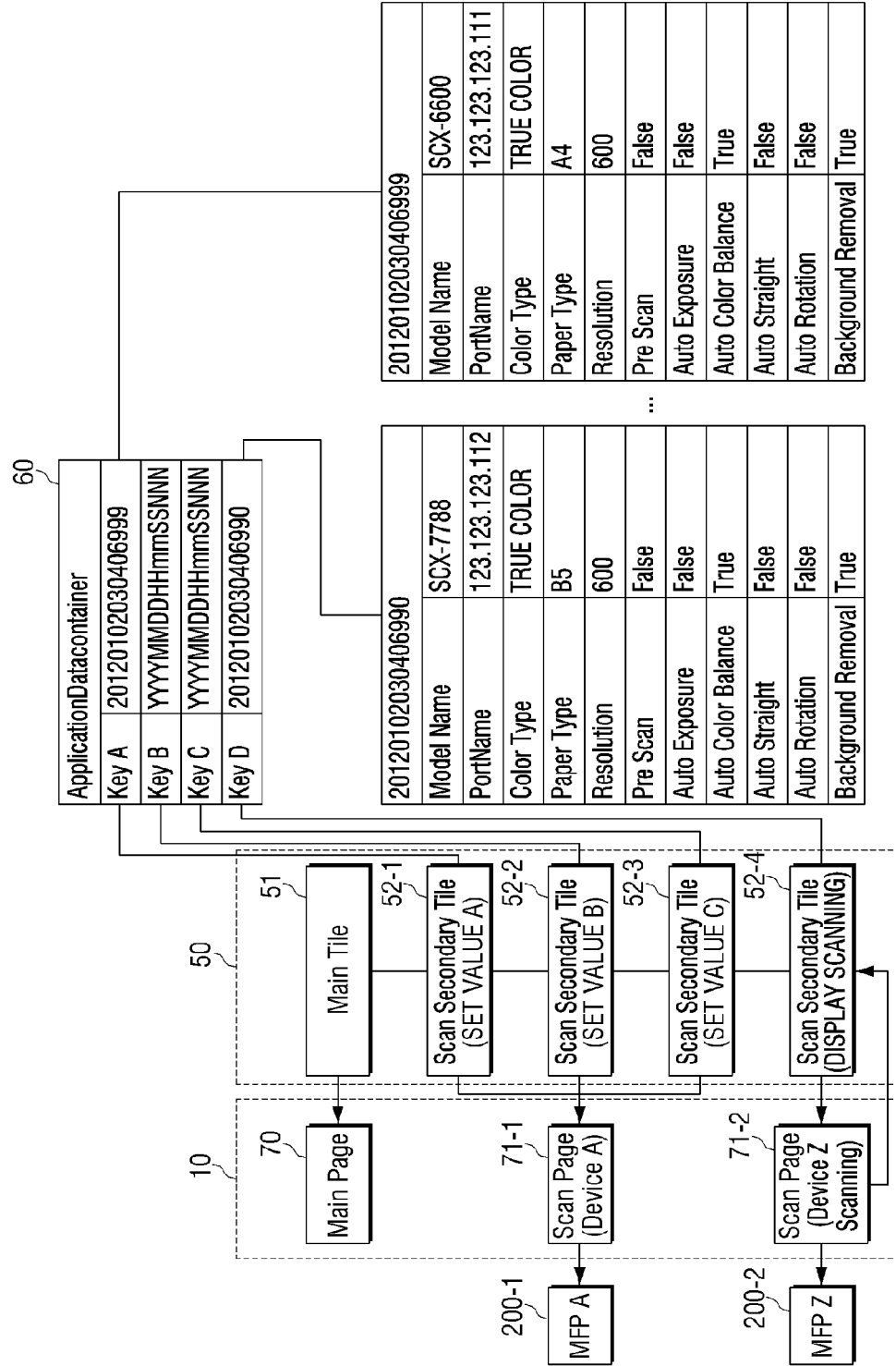
FIG. 15 illustrates a block diagram of programs implemented on a user terminal apparatus according to yet another exemplary embodiment of the present general inventive concept.

FIG. 15 illustrates relations between an application and a tile according to another exemplary embodiment.

Referring to FIG. 15, metro app 10 includes a main page 70 which is an application page, and scan pages 71-1, 71-2 which are scan job performing pages, respectively. A plurality of scan pages 71-1, 71-2 may connect to an MFP A 200-1 device and an MFP Z (200-2) device, respectively.

Each page may connect to each tile of a background screen (or a start screen) 50. Main page 70 connects a main tile 51. Scan page (device A) 71-1 connects a plurality of scan secondary tiles 52-1, 52-2, 52-3, and a scan page (device Z) 71-2 connects a scan secondary tile 51-4.

A plurality of scan secondary tiles 52-1, 52-2, 52-3 have different option values with respect to each other, and connect one scan page 71-1.

Scan options and device information of the image forming apparatus corresponding to scan secondary tiles 52-1, 52-2, 52-3, 52-4 respectively are stored in an application data container 60. Specifically, each tile may be set creating time (YYYYMMDDHHmmSSNNN) as an ID, and the ID may be used as a key to approach application data container 60.

Application data container 60 may map and store device information of the image forming apparatus and scan options with each tile ID in a lookup-table format.

Figure 20:
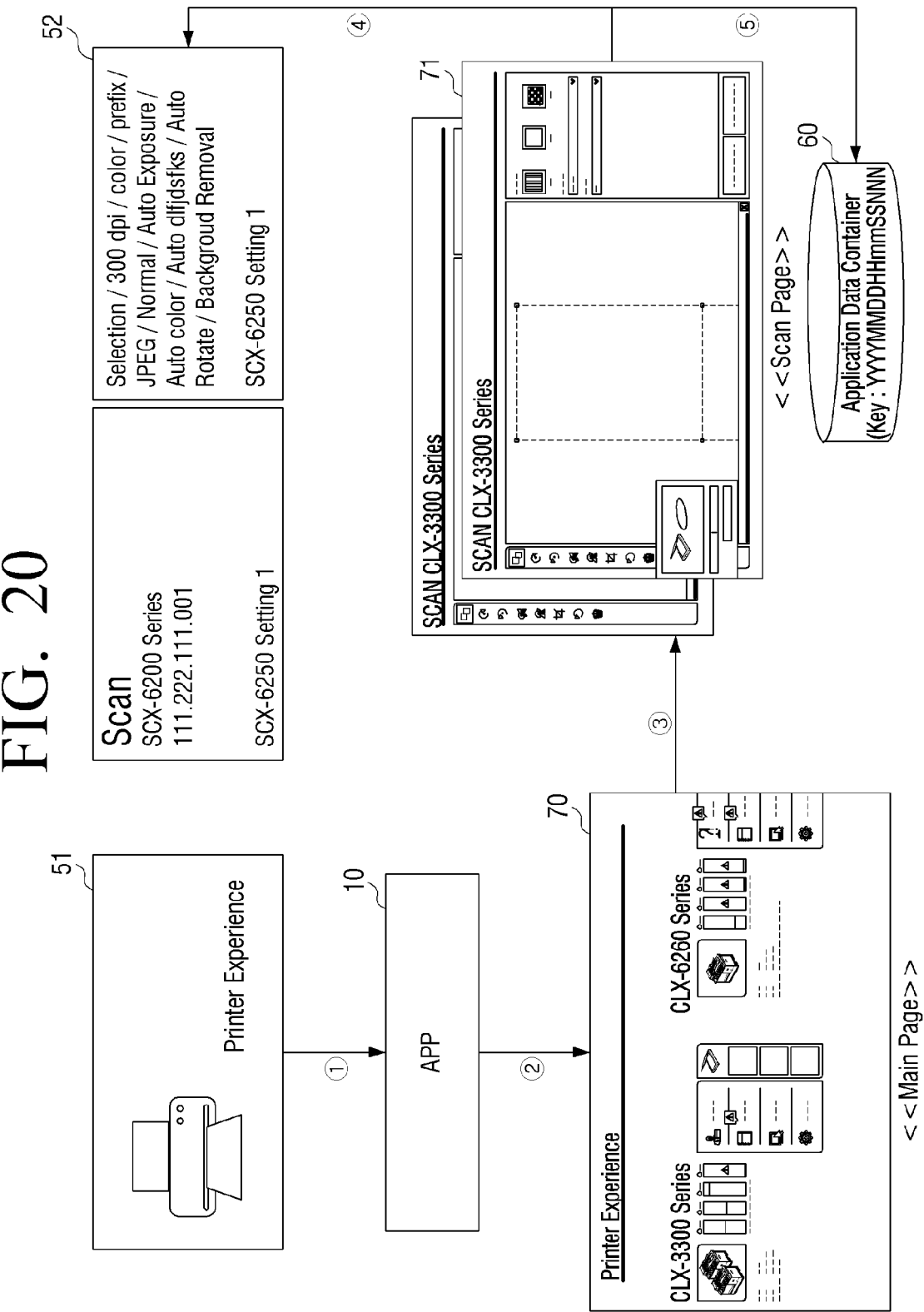
FIG. 20 illustrates an exemplary operation of creating a secondary tile of a user terminal apparatus according to an exemplary embodiment of the present general inventive concept.

FIG. 20 illustrates an operation creating a secondary tile of the user terminal apparatus 100 according to the exemplary embodiment.

By referring to FIG. 20, if application 10 is installed in a metro style UI environment of Windows® 8, a main tile 51 of the application may be displayed on a background screen (a start screen). A user may click or touch the main tile 51 and implement application 10.

If application 10 is implemented, an OnLaunched(LaunchActivatedEventArgs args) function of an application class is called, args.Arguments is set as a null value, and a main page 70 of the application may be displayed on a screen.

By selecting any one of a plurality of connected image forming apparatuses 200, a scan job performing page 71 of the selection of the image forming apparatus 200 may be displayed on the screen.

Figure 21:
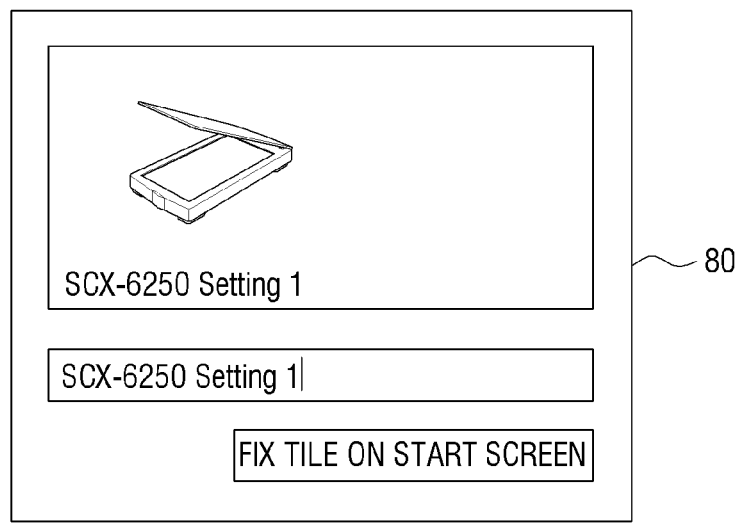
FIG. 21 illustrates an interface window to create a secondary tile of a user terminal apparatus according to an exemplary embodiment of the present general inventive concept.
Figure 22:
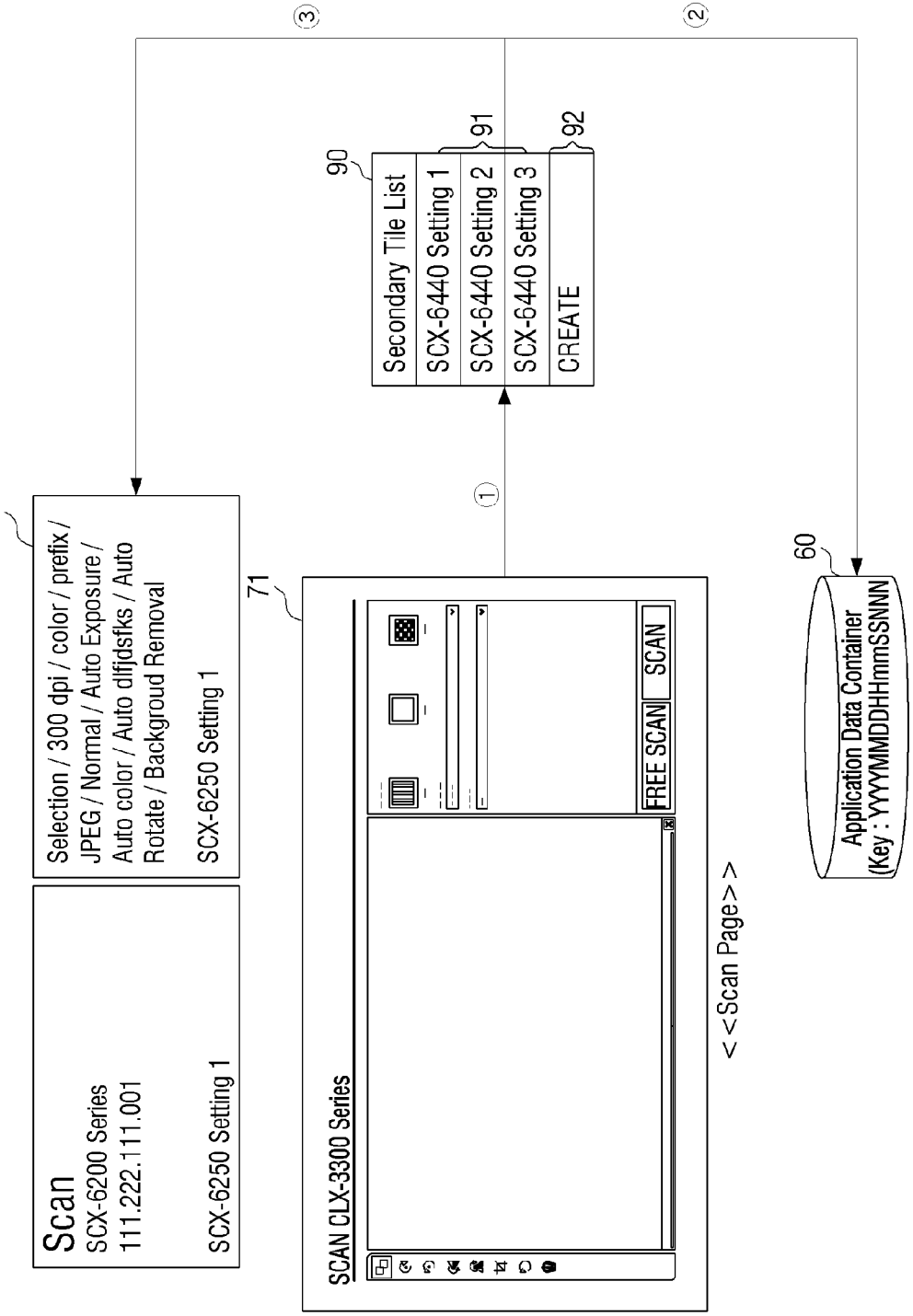
FIG. 22 illustrates an exemplary operation of updating a secondary tile according to an exemplary embodiment of the present general inventive concept.

Scan job options may be selected on a scan job performing page 71, and a secondary tile 52 may be created by using PinToStart (an example of a tile name) of Bottom Appbar (i.e., an example of a bar at the bottom of page 71; a bar is illustrated on FIG. 22). In this exemplary embodiment, creating time is set as a tile ID so that tile information may not be overwritten. Further, a tile name that a user desires may be set in "tile name input box" 80 provided by an O/S as illustrated in FIG. 21.

If creation of the secondary tile 52 is completed, an application data container 60 having a tile ID as a key value may be created and stored in a data format as in Table 9 below.

TABLE 9

| Application Data Container (Key: 20120101060712232) | |
|---|---|
| Model Name | SCX-6200 Series |
| Port Name | |
| Color Type | TRUE COLOR |
| Paper Type | B5 |
| Resolution | |
| Pre Scan | True |
| Auto Exposure | True |
| Auto Color Balance | True |
| Auto Straight | |
| Auto Rotation | True |
| Background Removal | True |

An example of creating code regarding the above tile and application data container is described in Table 10 below.

TABLE 10

```
content.TileId = current time (example:20120101060712232)
content.ShortName = model name
content.DisplayName = model name
content.Arguments = "ScanPage"
content.WideLogoReference = logo image
  var secondaryTile =
    new Windows.UI.StartScreen.SecondaryTile(content.TileId,
                                  content.ShortName,
                                    content.DisplayName,
                                   content.Arguments,
                     Windows.UI.StartScreen.TileOptions.-
                     ShowNameOnWideLogo,
                                      content.LogoReference,
                                      content.WideLogoReference);
```

TABLE 10-continued

```
ApplicationDataContainer container =
localSettings.CreateContainer(current time,
ApplicationDataCreateDisposition.Always);
```

As described in connection with FIG. 20 above, the user terminal apparatus 100 may perform an operation creating a secondary tile.

FIG. 22 illustrates an operation of updating a secondary tile according to an exemplary embodiment.

Referring to FIG. 22, if at least one secondary tile is already created on a scan job performing page 71, a list 90 of a secondary tile connected to the image forming apparatus 200 of scan job performing page 71 may be displayed on a screen.

A user may select a secondary tile to be updated 91, or may create a new secondary tile 92.

If a user selects a secondary tile to be updated, the user may update newly established scan options in an application data container 60 by using the selected tile ID. In order to update scan options showed by the secondary tile 52 on the background screen, tile notification included in scan options is transmitted to the tile. Only scan options may be updated by using a tag of notification such as "SettingInfo." Table 11 below is an example of including an update of secondary tile.

TABLE 11

```
var tileUpdater =
  TileUpdateManager.CreateTileUpdaterForSecondaryTile(TileID);
    TileNotification SettingInfoNotification = CreateSettingInfo( );
    SettingInfoNotification.Tag = "SettingInfo"
    tileUpdater.Update(SettingInfoNotification);
```

As described in connection with FIG. 22 above, the user terminal apparatus 100 may perform an operation updating a secondary tile.

Figure 23:
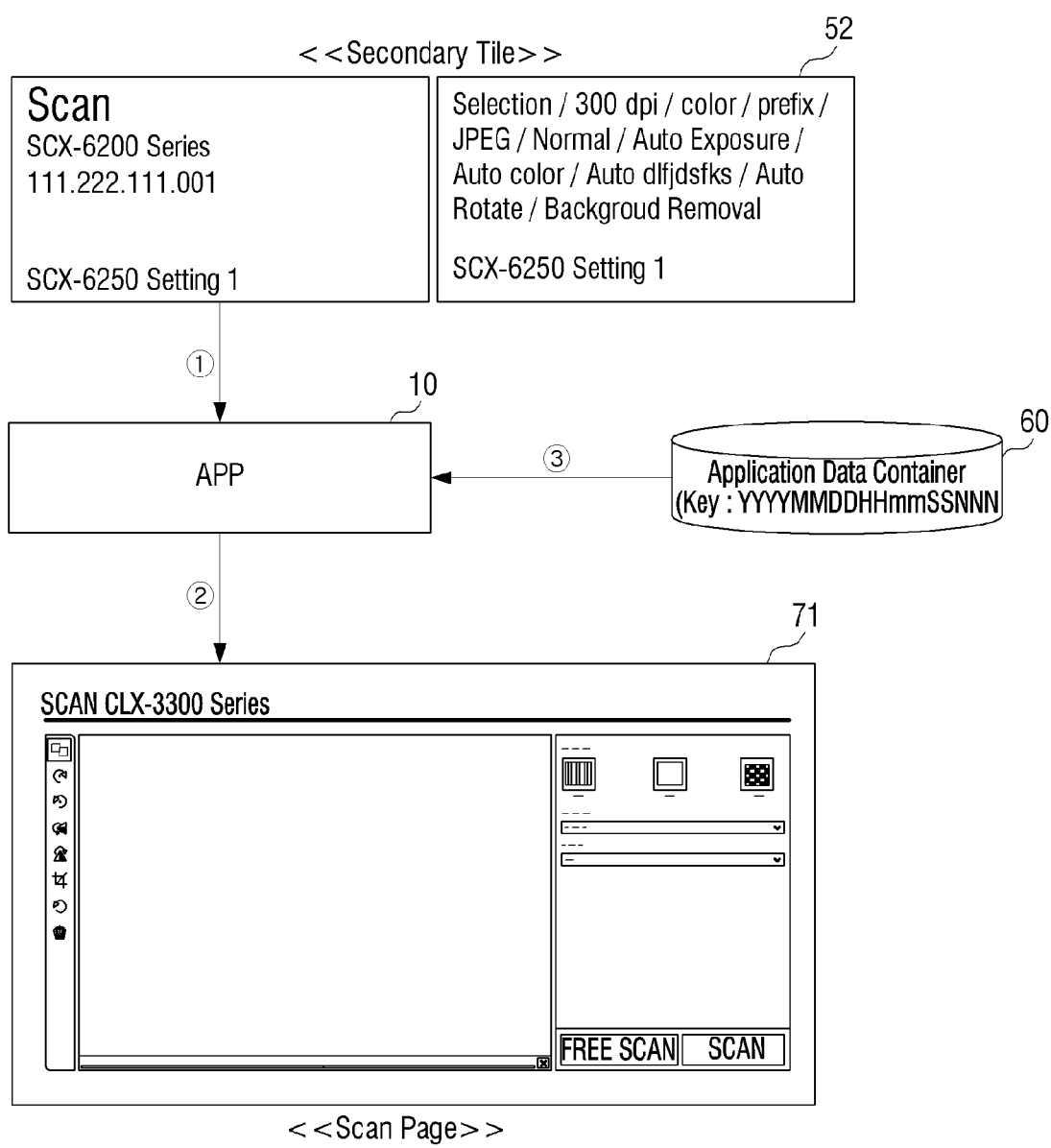
FIG. 23 illustrates an exemplary operation of implementing a secondary tile according to an exemplary embodiment of the present general inventive concept.

FIG. 23 illustrates an operation of performing a secondary tile according to an exemplary embodiment.

Referring to FIG. 23, if a touch or a click to select a secondary tile 52 displayed on a background screen is inputted, a corresponding application 10 implements an OnLaunched(LaunchActivatedEventArgs args) function, args.Arguments is set as a "ScanPage" value, and scan job performing page 71 of the application may be displayed on a screen.

By using tile ID as a key value, scan options stored in an application data container may be read and automatically applied to a scan job performing page 71. Table 12 below is an example of code loading scan options stored in an application data container.

TABLE 12

```
ApplicationDataContainer container =
                        ApplicationData.Current.LocalSettings.-
                        Containers[Tile ID];
  DeviceModelName = container.Values["ModelName"];
  DevicePortName = container.Values["PortName"];
  ColorType = container.Values["ColorType"];
  PaperType = container.Values["PaperType"];
  Resolution = container.Values["Resolution"];
  PreScan = container.Values["PreScan"];
  AutoExposure = container.Values["AutoExposure"];
  AutoColorBalance = container.Values["AutoColorBalance"];
  AutoStraight = container.Values["AutoStraight"];
  AutoRotation = container.Values["AutoRotation"];
  BackgroundRemoval = container.Values["BackgroundRemoval"];
```

The user terminal apparatus 100 may perform implementation of a secondary tile as described in connection with FIG. 23 above.

Figure 24:
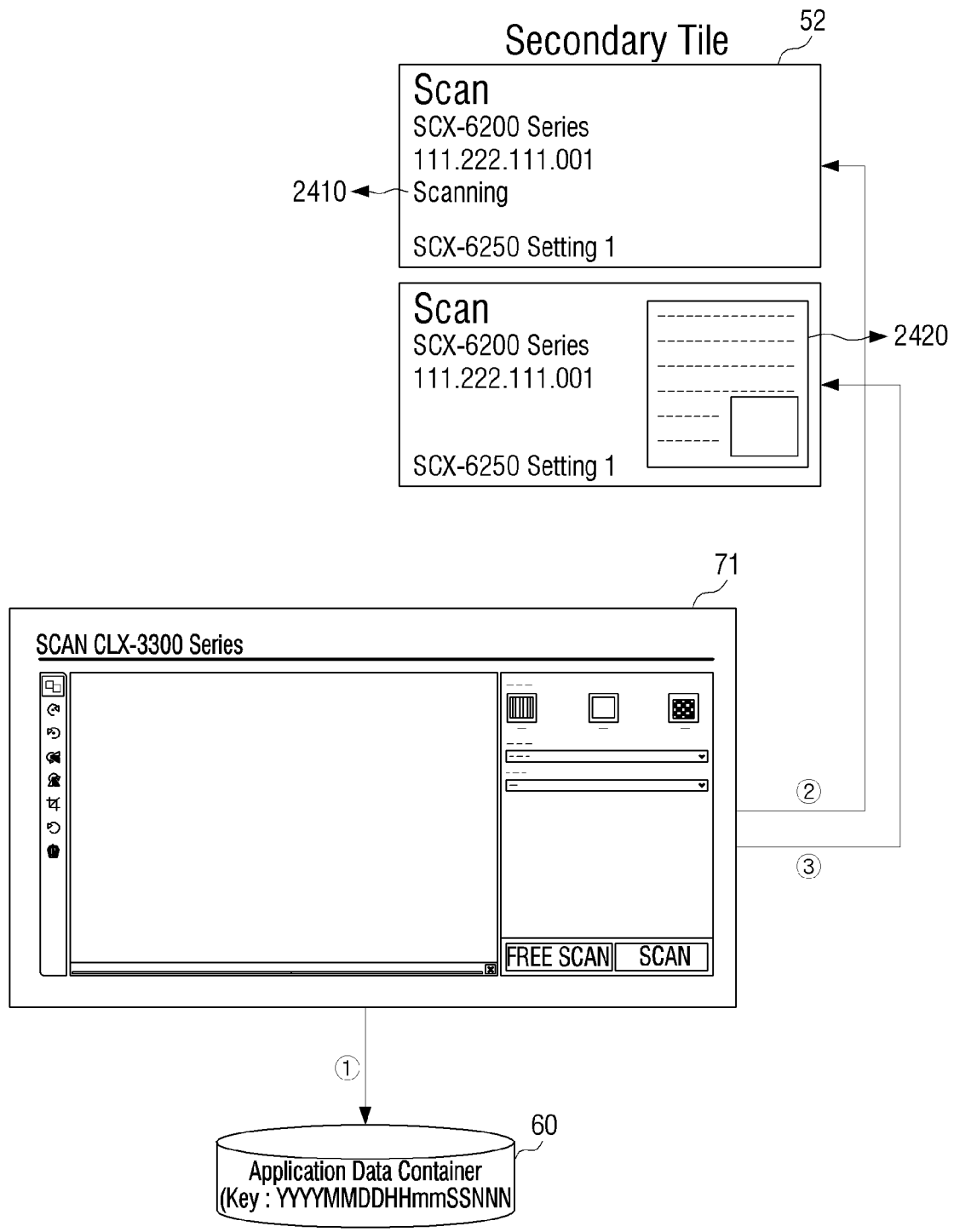
FIG. 24 illustrates an exemplary operation of marking a job implementing status of an image forming apparatus on a secondary tile according to an exemplary embodiment of the present general inventive concept.

FIG. 24 illustrates an operation of marking a job performing status of the image forming apparatus 200 on a secondary tile according to an exemplary embodiment.

By referring to FIG. 24, if a scan button is pushed on scan job performing page 71, a secondary tile 52 mapped with the connected image forming apparatus 200 in an application data container is found.

If a scan job begins, tile notification may be transmitted, and a scan job performing status may be marked on the secondary tile 52. Codes to transmit tile notification are shown in Table 13 below, and may be updated in device information of the image forming apparatus 200 which is already displayed by using a tag of a secondary tile such as "DeviceInfo."

TABLE 13

```
var tileUpdater =
  TileUpdateManager.CreateTileUpdaterForSecondaryTile(TileID);
    TileNotification DeviceInfoNotification = CreateDeviceInfo( );
    TileNotification SettingInfoNotification = CreateSettingInfo( );
    DeviceInfoNotification.Tag = "DeviceInfo"
    SettingInfoNotification.Tag = "SettingInfo"
    tileUpdater.Update(DeviceInfoNotification);
    tileUpdater.Update(SettingInfoNotification);
```

As described above, if transmitting and updating notification indicates that a scan job is being processed, secondary tile 52 may display "scanning" 2410. If transmitting and updating notification indicates that a scan job is completed, secondary tile 52 may display a scan image 2420.

As described in connection with diagram of FIG. 24 above, the user terminal apparatus 100 may perform marking a job performing status on a secondary tile.

Although the above embodiment is limited to focusing on a scan job, a print job or a fax job may also be applied.

Figure 25:
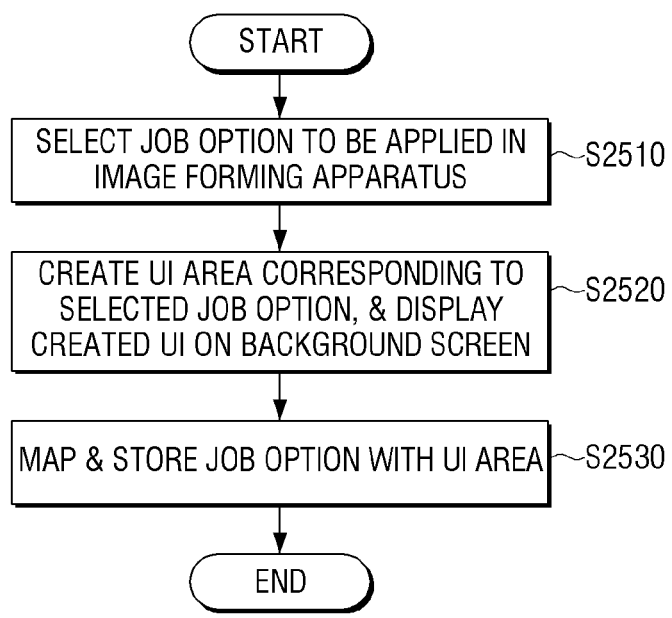
FIG. 25 is a flowchart illustrating a method of controlling a user terminal apparatus according to an exemplary embodiment of the present general inventive concept.

FIG. 25 is a flowchart illustrating a method of controlling the user terminal apparatus according to an exemplary embodiment.

Referring to FIG. 25, the user terminal apparatus 100 receives a selection of job options applied to the image forming apparatus 200 at operation S2510.

Before operation S2510, if a predefined UI area is selected on a background screen of an O/S, an application to perform jobs may be implemented. A predefined UI area may be a main tile of the application.

If job options are selected, the job options may be selected by the image forming apparatus 200 that is to perform the jobs.

The UI area corresponding to the selection of job options is created, and the created UI area is displayed on a background screen at operation S2520. In this exemplary embodiment, the predefined UI area may be a secondary tile of the application.

At operation S2530, job options may be mapped and stored with the created UI area.

The created UI area may be a secondary tile marking at least one of the job options and device information of the image forming apparatus to perform jobs, and may be displayed in a tile shape.

The method of controlling a user terminal apparatus in FIG. 25 may be implemented by the user terminal apparatus 100 having units of FIG. 1, or other units.

Figure 26:
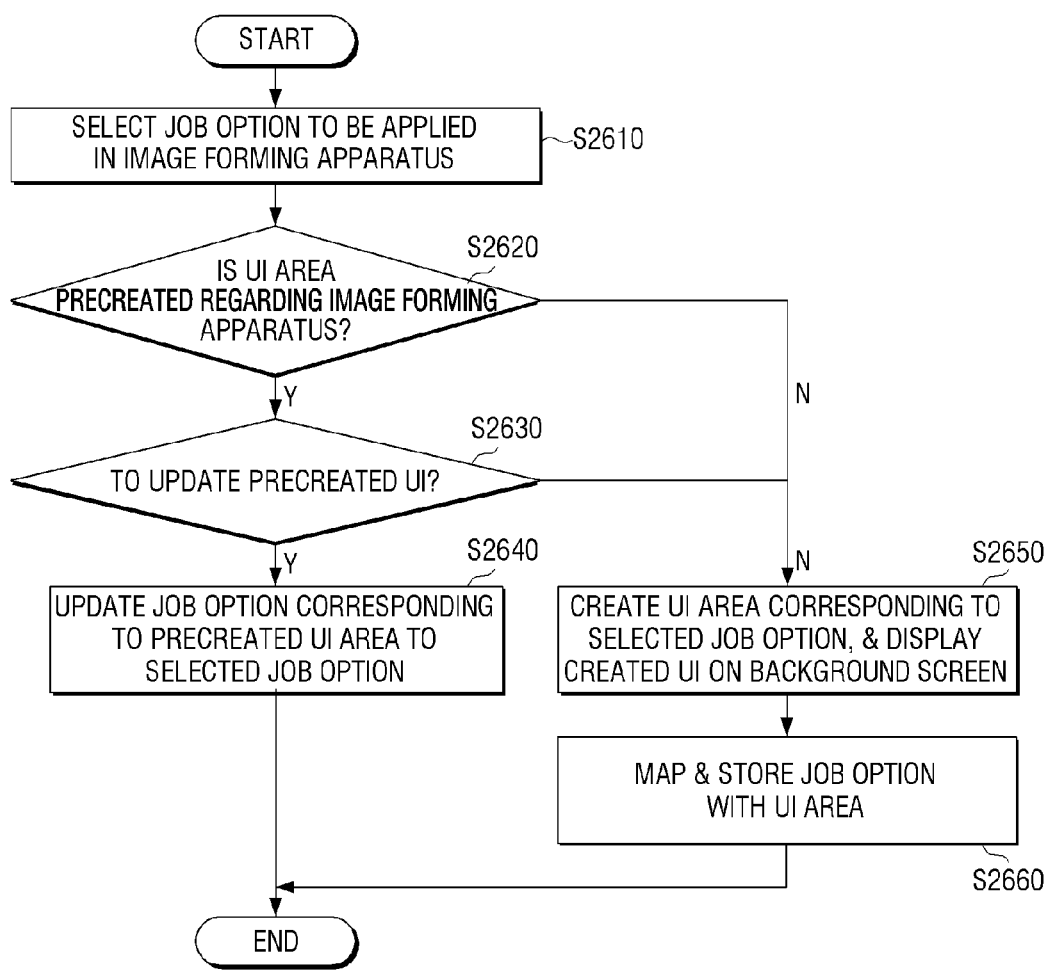
FIG. 26 is a flowchart illustrating a method of controlling a user terminal apparatus according to an exemplary embodiment of the present general inventive concept.

FIG. 26 is a flowchart illustrating a method of controlling the user terminal apparatus according to an exemplary embodiment.

Referring to FIG. 26, the user terminal apparatus 100 receives a selection of job options applied to the image forming apparatus 200 at operation S2610.

If job options are selected, the job options may be selected with the image forming apparatus 200 to perform jobs.

If a previously created UI area is found with respect to an image forming apparatus 200 at operation S2620:Yes, user manipulation may select whether job options corresponding to a previously created UI area is updated to job options selected by the user at operation S2630.

If the user selects an update at operation S2630:Yes, the job options corresponding to the previously created UI area may be updated to job options selected by the user at operation S2640.

If the user does not select an update at operation S2630:No, a UI area corresponding to the selection of job options may be newly created, and the created UI may be displayed on a background screen at operation S2650. Job options may be mapped and stored in the UI area at operation S2660.

The created UI area may be a secondary tile marking at least one of the job options and device information of the image forming apparatus to perform jobs, and may be displayed in a tile shape.

If the previously created UI area is not found at operation S2620, the operations at operation S2650 and operation S2660 may be performed.

The method of controlling a user terminal apparatus of FIG. 26 may be implemented by the user terminal apparatus 100 illustrated in FIG. 1, or other units to carry out the exemplary embodiments of the present general inventive concept disclosed herein.

Figure 27:
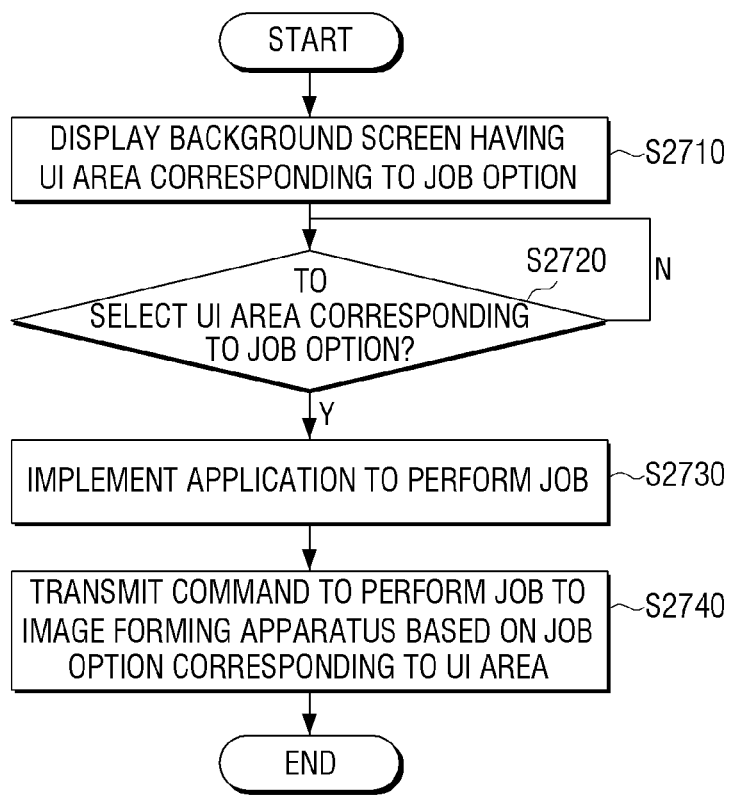
FIG. 27 is a flowchart illustrating a method of controlling a user terminal apparatus according to an exemplary embodiment.

FIG. 27 is a flowchart illustrating a method of controlling the user terminal apparatus 100 according to an exemplary embodiment.

Referring to FIG. 27, the user terminal apparatus 100 may display a background screen including a UI area corresponding to the job options at operation S2710. The UI area corresponding to the job options may be a secondary tile.

If a user selects a UI area at operation S2720:Yes, the image forming apparatus 200 and an application to perform jobs may be performed at operation S2730.

According to job options corresponding to a UI area, a command to perform a job may be transmitted to the image forming apparatus 200 at operation S2740.

A job performing page may be displayed with respect to an application for which job options corresponding to the UI area are automatically applied. In this exemplary embodiment, if user manipulation to modify job options is inputted on a job performing page, a command to perform a job may be transmitted to the image forming apparatus 200 according to the modified job options.

While performing the job in the image forming apparatus 200 according to the command to perform the job, the user terminal apparatus 100 may display job performing information of the image forming apparatus 200 on the UI area.

If the job is completed in the image forming apparatus according to the command to perform the job, job performing results of the image forming apparatus 200 may be displayed on the UI area.

The method of controlling a user terminal apparatus in FIG. 27 may be implemented by the user terminal apparatus 100 illustrated in FIG. 1, or other units may carry out the exemplary embodiments of the present general inventive concept disclosed herein.

The above method of controlling the user terminal apparatus 100 according to an exemplary embodiment may provide the UI area in which the image forming apparatus 200 to perform jobs and job options are automatically applied, and the image forming apparatus may perform jobs without redundant processes. Further, the user may intuitively observe the job performing information on a real time basis since the job performing status is marked on the UI area.

The above methods according to various exemplary embodiments may be programmed and stored in various types of storing medium. Thus, various types of electronic apparatuses implementing a storing medium may perform the above methods according to various exemplary embodiments.

Further, the above control methods may be implemented as programs having algorithms which may run in the computer, and the programs may be stored and provided in a non-transitory computer readable medium, i.e., a computer readable recording medium.

A non-transitory computer readable recording medium having programs to implement a control method of the user terminal apparatus according to an exemplary embodiment which may connect to an image forming apparatus having a scan function and which is driven in an O/S of Windows® 8 and includes programs having a metro application displaying user interface window receiving a command to perform a scan job and a V4 driver communicating with an image forming apparatus.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, hard disks, Blu-ray disks, USBs, memory card magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

A metro application requests and receives address information of the image forming apparatus to the V4 driver, so that if a command to perform a scan job is inputted through a user interface window, the metro application transmits the command to perform the scan job to the image forming apparatus according to the received address information, and receives scan data from the image forming apparatus. The V4 driver provides address information of the image forming apparatus to the metro application if the metro application requests address information of the image forming apparatus.

The metro application may communicate with the image forming apparatus by utilizing another network module different from the V4 driver.

If the command to perform the scan job is inputted, the metro application determines whether the image forming apparatus supports the V4 driver, displays the image forming apparatus supporting the V4 driver, and receives a selection of the image forming apparatus to perform the command to perform the scan job.

The V4 driver may request and receive status information of the image forming apparatus as well as address information of the image forming apparatus.

The metro application may display a user interface window to receive a selection of scan options according to the received status information of the image forming apparatus, receive a selection of scan options, and transmit the selection of scan options with a command to perform a scan job to the image forming apparatus.

The status information may include at least one of network information, supportable job information, and component consumption information regarding the image forming apparatus.

The V4 driver may be a printer driver supporting predefined Bidi communication schema.

The computer readable recording medium having programs to implement a control method of the user terminal apparatus according to an exemplary embodiment which may connect to the image forming apparatus and which is driven in an O/S of Windows® 8 may obtain address information of the image forming apparatus 200 in O/S that does not directly provide address information of a connected image forming apparatus, and may provide a metro application to perform a scan job by using the address information.

The computer readable recording medium having programs to implement the user terminal apparatus according to another exemplary embodiment which may connect to the image forming apparatus having the scan function and which is driven in an O/S of Windows® 8 and may include programs having a metro application to provide a user interface window having status information of the image forming apparatus and a V4 driver to communicate with the image forming apparatus.

The V4 driver receives a first status message and address information of the image forming apparatus. The metro application requests a second status message more detailed than the first status message to the image forming apparatus by utilizing the received address information through the V4 driver and displays at least one of the first and the second status messages on the user interface window.

The metro application may determine whether requesting a second status message is required according to types of the received first status message.

The metro application may request the second status message only if it is determined that the second status message is required.

If a user sets types of the first status message to request the second status message, the metro application may determine whether requesting the second status message is required according to types of a first status message established by the user.

If user manipulation to select the user interface window displaying status message is inputted, the metro application may connect to a troubleshooting page by using at least one of the first and the second status messages.

The first status message may be a message predefined in a V4 driver, or defined in an event XML of a V4 driver.

The second status message may include at least one attribute of a warning, an error and information regarding a status of the image forming apparatus.

If status attributes extracted from the second status message are not a warning or an error, the metro application may request a second status message again after a delay of a predetermined time.

The computer readable recording medium having programs to implement the user terminal apparatus according to an exemplary embodiment which may connect to the image forming apparatus and which is driven in an O/S of Windows® 8 may receive a detailed status message of the image forming apparatus in an O/S having limited status information of the image forming apparatus, and may provide a user with a metro application to provide a status information regarding an error or a warning of the image forming apparatus.

In a computer readable recording medium having a metro application to implement a control method of the user terminal apparatus according to an exemplary embodiment which may connect to the image forming apparatus and which is driven in an O/S of Windows® 8, the metro application operates if a UI area corresponding to job options is selected on a background screen of Windows® 8 and transmits a command to perform a job to the image forming apparatus according to job options corresponding to the UI area.

The metro application may operate if a UI area corresponding to job options is selected on a background screen of Windows® 8, display a job performing page in which job options corresponding to the UI area are automatically applied, and transmit a command to perform the job to the image forming apparatus according to modified job options if user manipulation to modify the job options is inputted on the job performing page.

While performing the job in the image forming apparatus according to the command to perform the job, the metro application may display job performing information of the image forming apparatus on the UI area.

If the job is completed in the image forming apparatus according to the command to perform the job, the metro application may display job performing results of the image forming apparatus on the UI area.

Further, in the computer readable recording medium having the metro application to implement a control method of the user terminal apparatus according to an exemplary embodiment which may connect to the image forming apparatus and which is operated in an O/S of Windows® 8, the metro application may display a user interface window to receive a selection of job options that are applied to the image forming apparatus, create a UI area corresponding to a selection of job options, display a created UI area on a background screen of Windows® 8, map job options with the UI area, and store the mapped information.

If the previously created UI area is found regarding the image forming apparatus, the metro application may update job options corresponding to the previously created UI area to a selection of job options, and display and store the updated job options according to user manipulation.

The metro application may receive a selection of the image forming apparatus to perform jobs as well as job options.

The created UI area may be a tile shape icon marking at least one of the job options and device information of the image forming apparatus to perform jobs.

The computer readable recording medium having the metro application to implement a control method of the user terminal apparatus according to an exemplary embodiment which may connect to the image forming apparatus and which is driven in an O/S of Windows® 8 may provide the metro application to provide a UI area where the image forming apparatus to perform jobs and job options which are automatically applied, to perform jobs without redundant processes, to display a job performing status on a UI area, and thus, to intuitionally illustrate job performing information to a user on a real time basis.

Exemplary embodiments of the present general inventive concept may also provide a non-transitory computer readable recording medium including a metro application, that when executed by a computer, performs a method of controlling a user terminal apparatus which connects to an image forming apparatus and which is driven by an operating system (O/S). The method includes selecting a user interface (UI) area on a user interface window provided by the metro application corresponding to a job option on a background screen of the O/S, requesting and receiving an address of the image forming apparatus using a predefined printer driver of the image forming apparatus, and transmitting, upon receipt of the address, to the image forming apparatus using the received address, a command to perform a job according to the selected job option that corresponds to the UI area.

Exemplary embodiments of the present general inventive concept may also provide a user terminal apparatus 100 which connects to an image forming apparatus 200 and which is driven by an operating system (O/S) that supports a metro style UI environment, where the user terminal apparatus 100 includes a user interface 108 to receive a command to control the image forming apparatus 200 to perform a job by using a user interface window 114 provided from a metro application, to display the image forming apparatus 200 that supports a predefined printer driver, and to implement the predefined printer driver to obtain address information of the image forming apparatus 200, and a controller 112 to select the image forming apparatus 200 and to transmit, using the obtained address information, a command to perform the job to the image forming apparatus 200.

The predefined printer driver may request and receive at least one of status information and address information of the image forming apparatus 200 selected by the user interface 108.

The status information may include at least one of network information, supportable job information, component consumption information regarding the image forming apparatus, capability information, a troubleshooting guide based on the capability information, functions of ordering consumables or linking a web page of manufacturers, display notification of errors while printing, a troubleshooting guide to a user during selecting, provision of various power settings, job accounting, confidential expression setting, and address information.

The network information may include information regarding a network connecting status of the image forming apparatus, a network security status, and a network port address or a network IP address.

The supportable job information may include whether at least one of print, scan and fax are supported, and whether options in each job are supported.

The predefined printer driver may use predefined Bidi communication schema to obtain at least one of address information and status information of the image forming apparatus selected by the user interface, where Bidi communication schema are bi-directional communication schemes.

The user interface 108 may implement a network module that directly communicates with the image forming apparatus using Simple Network Management Protocol (SNMP) or Hyper Transfer Protocol (HTTP), which is directly controlled by the metro style application.

Exemplary embodiments of the present general inventive concept may also provide a user terminal apparatus 100 which connects to an image forming apparatus 200 and which is driven by an operating system (O/S) that supports a metro style UI environment, the user terminal apparatus 100 including a user interface 108 to display a user interface window 114 provided by the metro application, a communication interface 118 to implement a predetermined printer driver of the image forming apparatus to request a first status of the image forming apparatus 100 from the image forming apparatus 200, and, if desired, to request a second status of the image forming apparatus 200 without using the predetermined printer driver, the user interface window 114 to receive and display at least the first status of the image forming apparatus 100, a controller 112 having a control display 116 to enable user manipulation to control the controller 112 to connect to a trouble shooting page using at least the first status message.

A non-transitory computer readable medium may be a medium that stores data semi-permanently and which may be read by devices, not a medium that stores data temporarily such as a register, a cache, or a volatile memory. Specifically, the above described applications or programs may be stored and provided in non-transitory computer readable medium such as the CD, the DVD, the hard disk, the Blu-ray disk, the USB, the memory card, and the ROM.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A non-transitory computer readable recording medium including a metro application that, when executed by a computer, performs a method of controlling a user terminal apparatus which is driven by an operating system (O/S), the method comprising:
   selecting a user interface (UI) area which corresponds to a job option and is displayed on a background screen of the operating system, the background screen comprising a main icon generated by installing the metro application and a secondary icon which corresponds to the UI area and is generated by a user;
   transmitting, by the metro application, a command to perform a job according to the job option to an image forming apparatus linked to the selected UI area; and
   displaying a result of performing the job of the image forming apparatus on the UI area displayed on the background screen,
   wherein the UI area displayed on the background screen has a shortcut format.

2. The non-transitory computer readable recording medium of claim 1, wherein the method of controlling the user terminal apparatus further comprises:
   displaying on the background screen, by the metro application, upon selecting the UI area corresponding to the job option on the background screen of the operating system, a job performing page on which the job option corresponding to the UI area is automatically applied;
   modifying, on the job performing page, the job option by a user; and
   transmitting to the image forming apparatus a command to perform the job according to the modified job option.

3. The non-transitory computer readable recording medium of claim 1, wherein the method of controlling the user terminal apparatus comprises:
   displaying, by the metro application, job performing information of the image forming apparatus on the UI area while the job is performed at the image forming apparatus according to the command to perform the job.

4. The non-transitory computer readable recording medium of claim 1, wherein the method of controlling the user terminal apparatus further comprises:
   displaying by the metro application, when the job is completed at the image forming apparatus according to the command to perform the job, a result of performing the job at the image forming apparatus on the UI area.

5. A non-transitory computer readable recording medium including a metro application that, when executed by a computer, performs a method of controlling a user terminal apparatus which connects to an image forming apparatus and which is driven by an operating system (O/S), the method comprising:
generating, when the metro application displays a user interface window to receive a selection of a job option to be applied to the image forming apparatus, a user interface (UI) area corresponding to the selected job option;
displaying the generated UI area on a background screen of the operating system while mapping and storing the job option to the UI area,
wherein background screen comprises a main icon generated by installing the metro application and a secondary icon corresponding to the generated UI area,
wherein the UI area displays a result of performing a job of the image forming apparatus, and
wherein the UI area displayed on the background screen has a shortcut format.

6. The non-transitory computer readable recording medium of claim 5, the method of controlling the user terminal apparatus including:
updating by the metro application, when there is a user interface (UI) area previously generated with respect to the image forming apparatus, the job option corresponding to the previously generated UI area according to the selected job option and according to a user manipulation; and
storing the updated, user manipulated, selected job option.

7. The non-transitory computer readable recording medium of claim 5, the method of controlling the user terminal apparatus including:
receiving the job option, by the metro application, along with the selection of the image forming apparatus to perform the job.

8. The non-transitory computer readable recording medium of claim 1, the method of controlling the user terminal apparatus including:
configuring the UI area in a tile form which displays at least one of the job option and device information with respect to the image forming apparatus to perform the job.

9. A method of controlling a user terminal apparatus which connects to an image forming apparatus and which is driven by an operating system (O/S), the method comprising:
displaying, on a background screen of the operating system, a user interface (UI) area corresponding to a job option, the background screen comprising a main icon generated by installing the metro application and a secondary icon which corresponds to the UI area and is generated by a user;
driving, by a metro application, when the UI area is selected, a control unit to transmit a command to the image forming apparatus linked to the displayed UI area to perform a job according to the job option; and
displaying a result of performing the job of the image forming apparatus on the UI area displayed on the background screen,
wherein the UI area displayed on the background screen has a shortcut format.

10. The method of claim 9, wherein the transmitting the command to perform the job further comprises:
displaying a job performing page of the metro application on which the job option corresponding to the UI area is automatically implemented; and
transmitting, when a user manipulation to modify the job option is inputted on the job performing page, a command to perform the job to the image forming apparatus according to the modified job option.

11. The method of claim 9, comprising displaying a background screen of the operating system on the user interface (UI) area corresponding to the job option while the job is performed at the image forming apparatus according to the command to perform the job.

12. The method of claim 9, wherein, when the job is completed at the image forming apparatus according to the command to perform the job, the method comprising displaying a result of performing the job at the image forming apparatus on the UI area.

13. A method of controlling a user terminal apparatus which connects to an image forming apparatus and which is driven by an operating system (O/S), the method comprising:
receiving, when a metro application is driven, a selection of a job option to be applied to the image forming apparatus;
generating a user interface (UI) area corresponding to the selected job option and displaying the generated UI area on a background screen of the operating system; and
mapping and storing the job option to the UI area,
wherein the background screen comprises a main icon generated by installing the metro application and a secondary icon corresponding to the generated UI area,
wherein the UI area displays a result of performing a job of the image forming apparatus, and
wherein the UI area displayed on the background screen has a shortcut format.

14. The method of claim 13, prior to the receiving of the selected job option, further comprising driving the metro application to perform the job, if a predefined UI area is selected on the background screen.

15. The method of claim 13, wherein the generating the UI area corresponding to the selected job option and the displaying the generated UI area on the background screen of the operating system comprises,
updating, when there is a previously generated UI area corresponding to the image forming apparatus, the job option corresponding to the previously generated UI area according to a user manipulation; and
displaying and storing the result.

16. The method of claim 13, wherein the receiving the selected job option comprises receiving a selection of the image forming apparatus to perform the job in addition to the job option.

17. The method of claim 9, further comprising configuring the UI area in a tile form which displays at least one of the job option and device information of an image forming apparatus to perform the job.

18. A user terminal apparatus which connects to an image forming apparatus and which is driven by an operating system (O/S), the user terminal apparatus comprising:
a storage to store at least one of address and status information of the image forming apparatus, a job option, and a metro application to perform a job;
a display to display a background screen of the operating system including a user interface (UI) area corresponding to the job option, the background screen comprising a main icon generated by installing the metro application and a secondary icon which corresponds to the UI area and is generated by a user;

a controller to execute the metro application, when the UI area is selected; and a communication interface to transmit, via the metro application, a command to perform the job to the image forming apparatus linked to the selected UI area, wherein the UI area displays a result of performing a job of the image forming apparatus, and wherein the UI area displayed on the background screen has a shortcut format.

19. A user terminal apparatus which connects to an image forming apparatus and which is driven by an operating system (O/S), the user terminal apparatus comprising:

a storage to store at least one of address and status information of the image forming apparatus, a job option, and a metro application to perform a job;

a user interface to receive a selection of a job option to be applied to the image forming apparatus via a user interface window provided by the metro application, and to display a generated user interface (UI) area on a background screen of the operating system; and a controller to map the job option to the UI area and store the result at the storage, wherein background screen comprises a main icon generated by installing the metro application and a secondary icon corresponding to the generated UI area, wherein the UI area displays a result of performing a job of the image forming apparatus, and wherein the UI area displayed on the background screen has a shortcut format.

20. The non-transitory computer readable recording medium of claim 1, wherein the secondary icon is an icon separate from a background screen, which is displayed in a foreground of the background screen.

* * * * *